United States Patent
Nakajima

(10) Patent No.: US 10,638,139 B2
(45) Date of Patent: Apr. 28, 2020

(54) ENCODING DEVICE, ENCODING METHOD, SENDING DEVICE, SENDING METHOD, RECEIVING DEVICE, RECEIVING METHOD, AND PROGRAM

(71) Applicant: SONY CORPORATION, Tokyo (JP)

(72) Inventor: Yasuhisa Nakajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/381,667

(22) Filed: Apr. 11, 2019

(65) Prior Publication Data
US 2019/0238862 A1    Aug. 1, 2019

Related U.S. Application Data

(62) Division of application No. 15/126,477, filed as application No. PCT/JP2015/061933 on Apr. 20, 2015, now Pat. No. 10,356,423.

(30) Foreign Application Priority Data

Apr. 22, 2014 (JP) .................. 2014-087931

(51) Int. Cl.
| | |
|---|---|
| *G06K 9/00* | (2006.01) |
| *H04N 19/17* | (2014.01) |
| *H04N 19/70* | (2014.01) |
| *G06F 3/14* | (2006.01) |
| *G09G 5/10* | (2006.01) |
| *H04N 19/98* | (2014.01) |
| *G09G 5/391* | (2006.01) |

(52) U.S. Cl.
CPC ............ *H04N 19/17* (2014.11); *G06F 3/14* (2013.01); *G09G 5/10* (2013.01); *G09G 5/391* (2013.01);
(Continued)

(58) Field of Classification Search
CPC ........ H04N 19/17; H04N 19/70; H04N 19/98; G06F 3/14; G09G 5/10; G09G 5/391;
(Continued)

(56) References Cited

U.S. PATENT DOCUMENTS

| | | | |
|---|---|---|---|
| 7,650,014 B2 * | 1/2010 | Ikeda ................. | G06K 9/00375 348/218.1 |
| 8,194,997 B2 | 6/2012 | Segall et al. | |

(Continued)

FOREIGN PATENT DOCUMENTS

| | | |
|---|---|---|
| JP | H06-086071 A | 3/1994 |
| JP | 2002-152680 A | 5/2002 |
| JP | 2005-352482 A | 12/2005 |

OTHER PUBLICATIONS

Hattori et al., HLS: SEI message for transfer function information, Joint Collaborative Team on Video Coding (JCT-VC) of ITU-T SG 16 WP 3 and ISO/IEC JTC 1/SC 29/WG 11, Oct. 23-Nov. 1, 2013, pp. 1-4, 15th Meeting, Geneva, CH.

(Continued)

*Primary Examiner* — Shefali D Goradia
(74) *Attorney, Agent, or Firm* — Paratus Law Group, PLLC

(57) ABSTRACT

A conversion from a dynamic range conversion image into a desired image is performed in a favorable manner. A setting unit sets a plurality of items of knee position information about a conversion from a first dynamic range image into a second dynamic range image. An encoding unit encodes the second dynamic range image to generate encoded data. A determination unit determines priority order of the plurality of items of knee position information. An adding unit adds the plurality of items of knee position information to the encoded data of the second dynamic range image, with the priority order given to the plurality of items of knee position information.

6 Claims, 16 Drawing Sheets

(52) U.S. Cl.
CPC ............. *H04N 19/70* (2014.11); *H04N 19/98* (2014.11); *G09G 2320/0271* (2013.01); *G09G 2370/04* (2013.01); *G09G 2370/047* (2013.01); *G09G 2370/12* (2013.01)

(58) Field of Classification Search
CPC ....... G09G 2320/0271; G09G 2370/04; G09G 2370/047; G09G 2370/12
See application file for complete search history.

(56) References Cited

U.S. PATENT DOCUMENTS

| | | |
|---|---|---|
| 9,826,248 B2 | 11/2017 | Hattori et al. |
| 2005/0259729 A1 | 11/2005 | Sun |
| 2010/0085482 A1 | 4/2010 | Toba et al. |
| 2013/0148029 A1 | 6/2013 | Gish et al. |
| 2017/0070701 A1 | 3/2017 | Nakajima |

OTHER PUBLICATIONS

Feb. 19, 2019, Japanese Office Action issued for related JP Application No. 2016-514908.

Hattori et al., HLS: SEI message for Knee Function Information, Joint Collaborative Team on Video Coding (JCT-VC) of ITU-T SG 16 WP 3 and ISO/IEC JTC 1/SC 29/WG 11, Jan. 9-17, 2014, pp. 1-21, 16$^{th}$ Meeting, San José, US.

\* cited by examiner

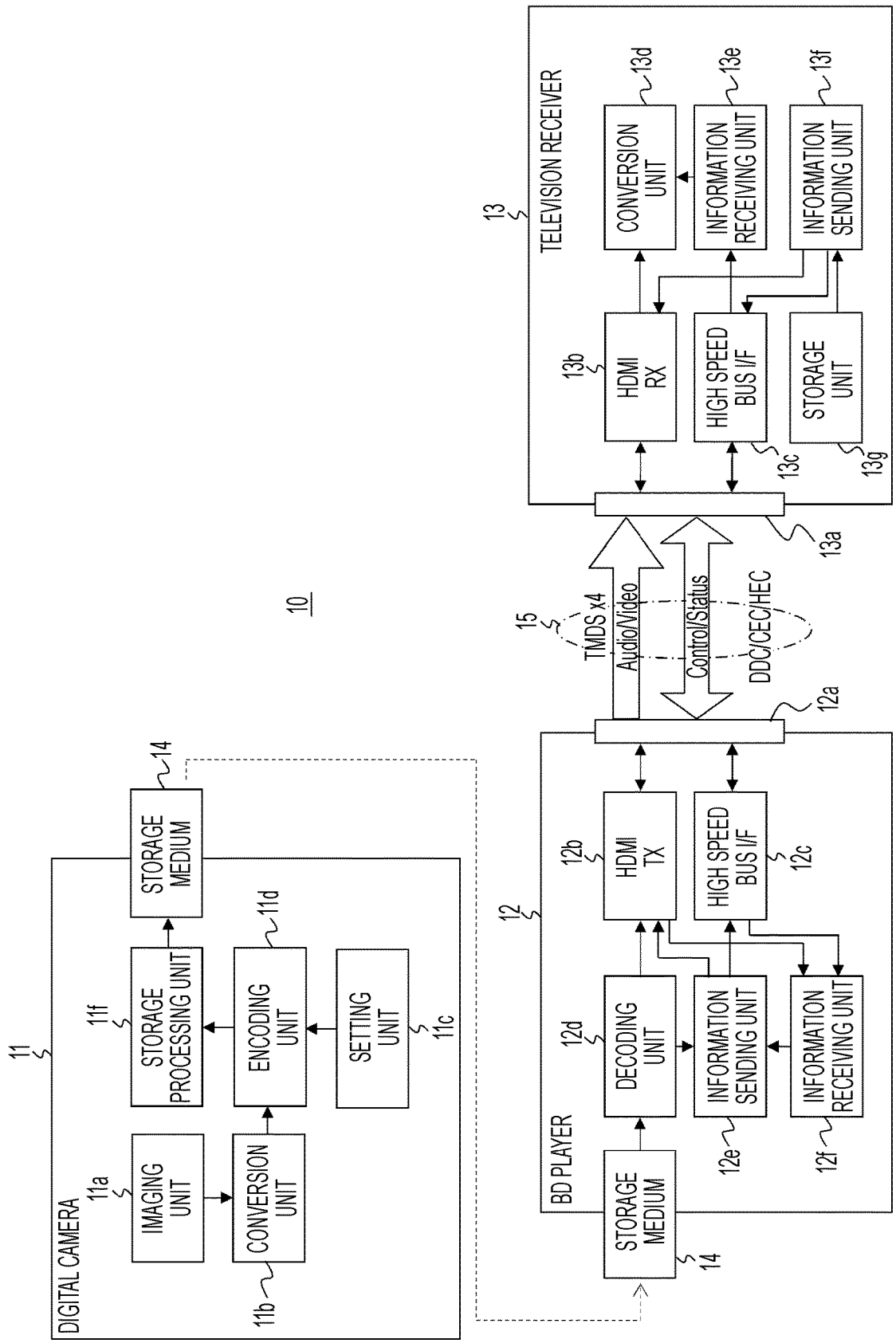

FIG. 2

EXEMPLARY DATA STRUCTURE OF knee_function_info SEI

| knee_function_info ( payloadSize ) { | Descriptor |
|---|---|
| knee_function_id | ue(v) |
| knee_function_cancel_flag | u(1) |
| if( !knee_function_cancel_flag ) { | |
|     knee_function_persistence_flag | u(1) |
|     mapping_flag | u(1) |
|     input_d_range | u(32) |
|     input_disp_luminance | u(32) |
|     output_d_range | u(32) |
|     output_disp_luminance | u(32) |
|     num_knee_points_minus1 | ue(v) |
|     for( i = 0; i <= num_knee_points_minus1; i++) { | |
|         input_knee_point[ i ] | u(10) |
|         output_knee_point[ i ] | u(10) |
|     } | |
|   } | |
| } | |

FIG. 11

EXEMPLARY DATA STRUCTURE OF Vendor Specific Data Block

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | | DVI_Dual |
| 7 | Reserved (0) | | | Max_TMDS_Clock | | | | |
| 8 | Reserved (0) | | | knee_Extension | CNC3 | CNC2 | CNC1 | CNC0 |
| 9 | DRIF | | | Knee_Point_Number (i) | | | | |
| 10...N | | | | Reserved (0) | | | | |

FIG. 12

EXEMPLARY DATA STRUCTURE (1) OF Vendor Specific InfoFrame

| Byte# | 7 | 6 | 5 | 4 | 3 | 2 | 1 | 0 |
|---|---|---|---|---|---|---|---|---|
| 0 | \multicolumn{8}{c}{Packet Type (0x81)} |
| 1 | CB | \multicolumn{7}{c}{Version (0x02)} |
| 2 | 0 | 0 | 0 | \multicolumn{5}{c}{Length (0x17)} |
| 3 | \multicolumn{8}{c}{Check Sum} |
| 4…6 | \multicolumn{8}{c}{IEEE Registration Identifier (0x000C03)} |
| 7 | HDR_flag | \multicolumn{7}{c}{Reserved (0)} |
| 8…11 | \multicolumn{8}{c}{input_d_range} |
| 12…15 | \multicolumn{8}{c}{input_disp_luminance} |
| 16…19 | \multicolumn{8}{c}{output_d_range} |
| 20…23 | \multicolumn{8}{c}{output_disp_luminance} |

FIG. 13

EXEMPLARY DATA STRUCTURE (2) OF Vendor Specific InfoFrame

| Byte# | 7 | 6 | 5 | 4 | 3 | 2 | 1 | 0 |
|---|---|---|---|---|---|---|---|---|
| 0 | Packet Type (0x81) | | | | | | | |
| 1 | Version (0x01) | | | | | | | |
| 2 | 0 | 0 | 0 | Length (6+3*i) | | | | |
| 3 | Check Sum | | | | | | | |
| 4...6 | IEEE Registration Identifier (0x000C03) | | | | | | | |
| 7 | Reserved (0) | | | | HDR_flag | | Reserved (0) | |
| 8 | knee_point Number (i) | | | | | | | |
| 9...11 | input_knee_point [1], output_knee_point [1] | | | | | | | |
| 12...14 | input_knee_point [2], output_knee_point [2] | | | | | | | |
| — | — | | | | | | | |
| 6+3*i...9+3*i | input_knee_point [i], output_knee_point [i] | | | | | | | |

FIG. 14

EXEMPLARY DATA STRUCTURE OF DR InfoFrame

| Byte# | 7 | 6 | 5 | 4 | 3 | 2 | 1 | 0 |
|---|---|---|---|---|---|---|---|---|
| 0 | Packet Type (0x83) ||||||||
| 1 | Version (0x01) ||||||||
| 2 | Length (18+3*i) ||||||||
| 3 | Check Sum ||||||||
| 4 | CF | PF | Reserved (0) ||||||
| 5...8 | input_d_range ||||||||
| 9...12 | input_display_luminance ||||||||
| 13...16 | output_d_range ||||||||
| 17...20 | output_disp_luminance ||||||||
| 21 | Number of knee_point [i] ||||||||
| 22...24 | input_knee_point [1], output_knee_point [1] ||||||||
| 25...27 | input_knee_point [2], output_knee_point [2] ||||||||
| — | — ||||||||
| 19+3*i...21+3*i | input_knee_point [i], output_knee_point [i] ||||||||

ENCODING DEVICE, ENCODING METHOD, SENDING DEVICE, SENDING METHOD, RECEIVING DEVICE, RECEIVING METHOD, AND PROGRAM

CROSS REFERENCE TO PRIOR APPLICATION

This application is a divisional of U.S. patent application Ser. No. 15/126,477 (filed on Sep. 15, 2016), which is a National Stage Patent Application of PCT International Patent Application No. PCT/JP2015/061933 (filed on Apr. 20, 2015) under 35 U.S.C. § 371, which claims priority to Japanese Patent Application No. 2014-087931 (filed on Apr. 22, 2014), which are all hereby incorporated by reference in their entirety.

TECHNICAL FIELD

The present invention relates to an encoding device, an encoding method, a sending device, a sending method, a receiving device, a receiving method, and a program. More specifically, the present invention relates to an encoding device or the like that encodes dynamic range conversion image data.

BACKGROUND ART

In recent years, a high dynamic range display device having a maximum luminance of more than 1000 cd/m2 has been put to practical use owing to advances in technology.

Such a display method can be considered that a high dynamic range image is converted into a standard dynamic range image and transmitted to a display device together with conversion information via a transmission line, and the standard dynamic range image is converted into a dynamic range adapted to a maximum luminance of the display device based on the transmitted conversion information. For example, Patent Document 1 has proposed a system of recoding high dynamic range image data and a process therefor.

CITATION LIST

Patent Document

Patent Document 1: Japanese Patent Application Laid-Open No. 2005-352482

SUMMARY OF THE INVENTION

Problems to be Solved by the Invention

After a conversion of a dynamic range, not all the items of conversion information required for a dynamic range conversion can be transmitted due to a restriction on a transmission rate of a transmission line, and the conversion into an image intended by a producer might not be sufficiently performed. In addition, due to a restriction on arithmetic capacity of a device that performs a dynamic range conversion process, not all the transmitted items of conversion information required for the dynamic range conversion can be used, and similarly, the conversion into an image intended by a producer might not be sufficiently performed.

The present technology allows a conversion from a dynamic range conversion image into a desired image to be performed in a favorable manner.

Solutions to Problems

A concept of the present technology is an encoding device including:

a setting unit configured to set a plurality of items of knee position information about a conversion from a first dynamic range image into a second dynamic range image;

an encoding unit configured to encode the second dynamic range image to generate encoded data;

a determination unit configured to determine priority order of the plurality of items of knee position information; and an adding unit configured to add the plurality of items of knee position information to the encoded data of the second dynamic range image, with the priority order given to the plurality of items of knee position information.

In the present technology, the plurality of items of knee position information about the conversion from the first dynamic range image into the second dynamic range image is set by the setting unit. The second dynamic range image is encoded and the encoded data are generated by the encoding unit. The priority order of the items of knee position information is determined by the determination unit. For example, the determination unit may determine the priority order of the plurality of items of knee posit iron information on the basis of a compression/extension rate of a knee position indicated by each of the plurality of items of knee position information.

By the adding unit, the plurality of items of knee position information is added to the encoded data of the second dynamic range image, with the priority order given to the plurality of items of knee position information. For example, the priority order may be given to the plurality of items of knee position information in such a manner that an array is arranged in the priority order. In addition, alternatively, for example, the priority order may be given to the plurality of items of knee position information in such a manner that information indicating priority relation of the plurality of items of knee position information is added.

As described above, in the present technology, the plurality of items of knee position information about the conversion is added to the encoded image data of the second dynamic range image obtained from the first dynamic range image, with the priority order given to the plurality of items of knee position information. Therefore, for example, even when not all the items of knee position information can be transmitted, or even when not all the items of knee position information can be used, a dynamic range conversion image can be easily converted into a desired image.

In other words, when not all the items of knee position information can be transmitted due to a restriction on a transmission rate of a transmission line, an item of knee position information having high priority order can be easily and selectively transmitted on the basis of the priority order information. In addition, when not all the items of knee position information can be used due to a restriction on arithmetic capacity of a device that performs a dynamic range conversion process, an item of knee position information having high prior ty order can be easily and selectively used on the basis of the priority order information.

Note that the present technology may further include, for example, a storage processing unit configured to store, in a storage medium, the encoded data of the second dynamic range image to which the plurality of items of knee position information has been added.

In addition, another concept of the present technology is a sending device including:

a data sending unit configured to send uncompressed image data of a second dynamic range image to an external device via a transmission line; and an information sending unit configured to send, to the external device via the transmission line, knee position information about a conversion from a first dynamic range image into the second dynamic range image, with the knee position information limited to the number of knee positions which the external device is capable of dealing with.

In the present technology, the uncompressed image data of the second dynamic range image are sent by the data sending unit to the external device via the transmission line. For example, the data sending unit may send the uncompressed image data to the external device via the transmission line by means of a differential signal.

By the information sending unit, the knee position information about the conversion from the first dynamic range image into the second dynamic range image is sent to the external device via the transmission line, with the knee position information limited to the number of knee positions which the external device is capable of dealing with. For example, the information sending unit may send, to the external device, a plurality of items of knee position information of the uncompressed image data that are sent by the data sending unit by inserting the plurality of items of knee position information in a blanking interval of the uncompressed image data.

In addition, for example, an information receiving unit configured to receive, from the external device, information of the number of knee positions which the external device is capable of dealing with may further be included. In addition, for example, a data acquisition unite, configured to acquire encoded data of the second dynamic range image to which the plurality of items of knee position information has been added, with priority order given to the plurality of items of knee position information; a decoding unit configured to decode the encoded data of the second dynamic range image to obtain the uncompressed image data of the second dynamic range image; and an information selecting unit configured to select, from among the plurality of items of knee position information on the basis of the priority order, the item of knee position information, the number of which is equivalent to the number of knee positions which the external device is capable of dealing with, may further be included.

As described above, in the present technology, the knee position information about the conversion from the first dynamic range image into the second dynamic range image is sent to the external device, with the knee position information limited to the number of knee positions which the external device is capable of dealing with. In the external device, therefore, the item of knee position information, the number of which is equivalent to the number which the external device itself is capable of dealing with, can be received, and a dynamic range conversion image can be easily converted into a desired image without a process of selecting the item of knee position information to be used.

In addition, another concept of the present technology is a receiving device including:

an image data receiving unit configured to receive uncompressed image data of a second dynamic range image from an external device via a transmission line;

an information receiving unit configured to receive, from the external device via the transmission line, a predetermined number of items of knee position information about a conversion from a first dynamic range image into the second dynamic range image;

a conversion processing unit configured to perform, on the uncompressed image data of the second dynamic range image, a conversion process that is based on the predetermined number of items of knee position information to obtain uncompressed image data of a predetermined dynamic range image; and an information sending unit configured to send, to the external device via the transmission line, information of the number of knee positions which the receiving device itself is capable of dealing with.

In the present technology, the uncompressed image data of the second dynamic range image are received by the data receiving unit from the external device via the transmission line. For example, the data receiving unit may receive the uncompressed image data from the external device via the transmission line by means of a differential signal.

By the information receiving unit, the predetermined number of items of knee position information about the conversion from the first dynamic range image into the second dynamic range image is received from the external device via the transmission line. For example, the information receiving unit may extract a plurality of items of knee position information of the uncompressed image data received by the data receiving unit from a blanking interval of the uncompressed image data.

The information of the number of knee positions which the receiving device itself is capable of dealing with is sent by the information sending unit, to the external device via the transmission line. For example, a storage unit configured to store the information of the number of knee positions may further be included, and the information sending unit may acquire and send the information of the number of knee positions from the storage unit.

As described above, in the present technology, the predetermined number of items of knee position information about the conversion from the first dynamic range image into the second dynamic range image is received from the external device, the conversion process that is based on the knee position information is performed on the uncompressed image data of the second dynamic range image, and the information of the number of knee positions which the receiving device itself is capable of dealing with is sent to the external device. Therefore, the item of knee position information, the number of which is equivalent to the number which the receiving device itself is capable of dealing with, can be received from the external device, and a dynamic range conversion image can be easily converted into a desired image without a process of selecting the item of knee position information to be used.

Effects of the Invention

According to the present technology, a conversion from a dynamic range conversion image into a desired image can be performed in a favorable manner. Note that the effects described in the present description are only examples, and the effects of the present invention are not limited to these effects. Additional effects may also be obtained.

BRIEF DESCRIPTION OF DRAWINGS

FIG. 1 is a block diagram illustrating an exemplary configuration of an AV system as an embodiment.

FIG. 2 is a diagram explaining schematic dynamic range conversion information generated by an encoding device.

FIG. 11 is a diagram illustrating an exemplary data structure of a vender specific region of the E-EDID.

FIG. 12 is a diagram illustrating an exemplary data structure (1) of the dynamic range conversion information transmitted by a vendor specific InfoFrame packet.

FIG. 13 is a diagram illustrating an exemplary data structure (2) of the dynamic range conversion information transmitted by the vendor specific InfoFrame packet.

FIG. 14 is a diagram illustrating an exemplary data structure of the dynamic range conversion information transmitted by a dynamic range InfoFrame packet.

MODE FOR CARRYING OUT THE INVENTION

Figure 3:
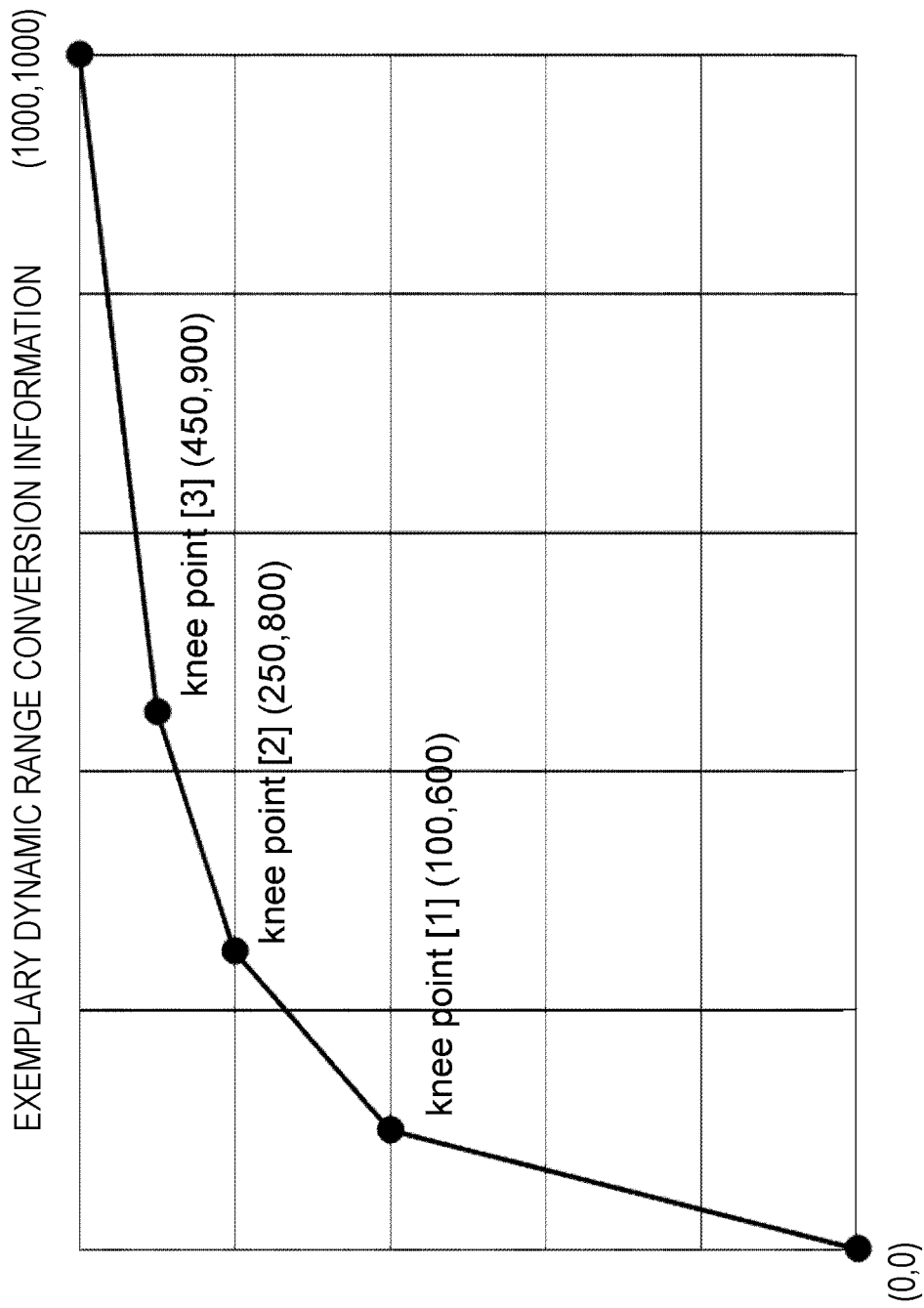
FIG. 3 is a diagram explaining knee extension.

Hereinafter, a mode for carrying out the invention (hereinafter referred to as an "embodiment") will be described. Note that the description will be provided in the following order:
1. EMBODIMENT
2. VARIATION 1. Embodiment

[Exemplary Configuration of AV System]

FIG. 1 is a diagram illustrating an exemplary configuration of an audio visual (AV) system 10 as an embodiment. The AV system 10 has a digital camera 11 serving as an imaging device for a high dynamic range image, a Blu-ray Disc (BD) player 12 serving as an HDMI source device, and a television receiver 13 serving as an HDMI sink device. The digital camera 11 and the BD player 12 exchange a high dynamic range image via a storage medium 14 such as, for example, a BD disc and a memory card. The BD player 12 and the television receiver 13 are coupled to each other via an HDMI cable 15 serving as a transmission line.

The digital camera 11 has an imaging unit 11a, a conversion unit 11b, a setting unit 11c, an encoding unit 11d, and a storage processing unit 11f. The imaging unit 11a captures a first dynamic range image. The conversion unit 11b converts the first dynamic range image into a second dynamic range image. The setting unit 111c supplies conversion information that is used in the encoding unit 11d. The encoding unit 11d encodes the second dynamic range image converted by the conversion unit 11b. The storage processing unit stores image data encoded by the storage medium 14.

The setting unit 11c sets a sequence parameter set (SPS) a picture parameter set (PPS), video usability information (VUI), and supplemental enhancement information (SEI) or the like. In addition, the setting unit 11c also sets, as the SEI, knee function info SEI (knee_function_info SEI) including conversion information in response to an instruction by a producer or the like. The setting unit 11c supplies, to the encoding unit 11d, a parameter set such as the SPS, the PPS, the VUI, and the SEI that have been set.

The BD player 12 has a decoding unit 12d, an information sending unit 12e, an HDMI terminal 12a, and an information receiving unit 12f. The decoding unit 12d reads encoded data from the storage medium 14 and decodes the encoded data into an uncompressed image. The information sending unit 12e acquires conversion information of a high dynamic range image from the data decoded by the decoding unit 12d, and sends the conversion information to the television receiver 13 via the HDMI cable 15. An HDMI sending unit (HDMITX) 12b and a high speed bus interface (high speed bus I/F) 12c are connected to the HDMI terminal 12a. The information receiving unit 12f receives information of the number of knee positions which the television receiver 13 can deal with sent from the television receiver 13.

One end of the HDMI cable 15 is connected to the HDMI terminal 12a of the BD player 12, and the other end of the HDMI cable 15 is connected to an HDMI terminal 13a of the television receiver 13.

The television receiver 13 has the HDMI terminal 13a, an information receiving unit 13e, a conversion unit 13d, an information sending unit 13f, and a storage unit 13g. An HDMI receiving unit (HDMIRX) 13b and a high speed bus interface (high speed bus I/F) 13c are connected to the HDMI terminal 13a. The information receiving unit 13e receives conversion information of an uncompressed image sent from the BD player 12. The conversion unit 13d converts a dynamic range of an uncompressed image received by the HDMI receiving unit 13b based on received conversion information. The information sending unit 13f sends, to the BD player 12, information of the number of knee positions which the television receiver 13 can deal with. The storage unit 13g stores information of the number of knee positions.

"Example of Syntax of Knee Function Into SEI"

Currently, for the purpose of improving encoding efficiency, standard encoding system called high efficiency video coding (HEVC) has been advanced by Joint Collaboration Team-Video Coding (JCTVC) that is a joint standardization organization of ITU-T and ISO/IEC. As their proposal for the standardization, knee function info SEI (knee_function_info SEI) has been proposed as compression/extension conversion information of a high dynamic range image.

FIG. 2 is a diagram illustrating an example of syntax of the knee function info SEI. In the knee function info SEI, a knee conversion ID (knee_function_id) and a knee conversion cancellation flag (knee_function_cancel_flag) are set. The knee conversion ID is an ID unique to a purpose of a knee conversion that is knee compression or knee extension. In addition, the knee conversion cancellation flag is a flag representing whether continuity of the most recent knee function info SEI is to be cancelled. The knee conversion cancellation flag is set to a high level "1" when continuity of the preceding knee function info SEI is to be cancelled, and set to a low level "0" when it is not to be cancelled.

In addition, when the knee conversion cancellation flag is the low level "0", dynamic range conversion information is set in the knee function info SEI. For the dynamic range conversion information, a persistence flag (knee_function_persistence_flag), a compression/extension flag (mapping_flag), input image dynamic range information (input_d_range), input image displaying display maximum luminance information (input_disp_luminance), output image dynamic range information (output_d_range), output displaying display maximum luminance information (output_disp_luminance), and knee position number information (num_knee_point_minus1) are set. Then, before-conversion position information (input_knee_point) and after-conversion position information (output_knee_point) are set for each knee position.

The persistence flag indicates whether the knee function info SEI sent one time is valid after that or valid only once. The persistence flag is set to a low level when the knee function info SEI is valid only for a picture to which the knee function info SEI has been added. The persistence flag is set to a high level "1" when the knee function info SEI is valid until a stream is switched or new knee function info SEI arrives.

The compression extension flag is a flag representing whether the knee conversion is the knee compression. Specifically, in a case where the number of knee positions is one, the knee conversion can be determined to be the knee extension when the before-conversion position information is equal to or greater than the after-conversion position information, and the knee conversion can be determined to be the knee compression when the before-conversion position information is less than the after-conversion position information.

However, in a case where the number of knee positions is plural, it cannot be accurately determined whether the knee conversion is the knee extension or the knee compression based on the magnitude relation between the before-conversion position information and the after-conversion position information. In this case, therefore, a compression flag is set. Note that the compression flag may be set even when the number of knee points is one. The compression flag is set to a high level "1" when the knee conversion is the knee compression, and set to a low level "0" when the knee compression is the knee extension.

The knee position number is a value obtained by subtracting one from the number of knee positions Note that order i in which the before-conversion position information and the after-conversion position information of the knee position are set (i is an integer equal to or greater than zero) is ascending order of the before-conversion position information.

The before-conversion position information (input_knee_point) is information representing a knee position of an image to be encoded before conversion in a dynamic range conversion. The before-conversion position information is a permillage of the knee position obtained when a maximum value of a luminance of the image to be encoded is assumed to be 1000 permil. The knee position is a luminance other than zero of a start point of a range of luminance subjected to the knee conversion at the same conversion rate within a dynamic range of the luminance of the image to be encoded.

The after-conversion position information (output_knee_point) is information representing a start point of a range of luminance, in an image converted in the dynamic range conversion, corresponding to the range of the luminance having the start point at the knee position and subjected to the knee conversion. More specifically, the after-conversion position information is a permillage of the luminance of the converted image corresponding to a knee point obtained when a maximum value of the luminance of the converted image is assumed to be 1000 permil.

FIG. 3 is a diagram illustrating an example in which the first dynamic range image to be encoded is a high dynamic range image A conversion image desired by a user is the second dynamic range image obtained after 0 to 40%, 40 to 100%, 100 to 180%, and 180 to 400% of a luminance of the high dynamic range image are subjected to the knee conversion into 0 to 60%, 60 to 80%, 80 to 90%, and 90 to 100%.

In this case, for the knee function info SEI, 100 is set as the before-conversion position information (input_knee_point [0]) of a first knee position, and 600 is set as the after-conversion position information (output_knee_point [0]). As the before-conversion position information (input_knee_point [1]) of a second knee position, 250 is set, and 800 is set as the after-conversion position information (output_knee_point [1]). As the before-conversion position information (input_knee_point [2]) of a third knee position, 450 is set, and 900 is set as the after-conversion position information (output_knee_point [2]).

In addition, in the example of FIG. 3, other parameters of the knee function info SEI are assumed such that the input image dynamic range information (input_d_range) is 4000, the input image displaying display maximum luminance information (input_disp_luminance) is 800 (cd/m2), and the compression flag (mapping_flag) is 1.

Therefore, the television receiver 13 recognizes that first to third luminances "output_knee_point" are 60%, 80%, and 90%, respectively. In addition, the television receiver 13 also recognize that a maximum value of the luminance of the image to be encoded is 400% based on the input image dynamic range information.

Then, the television receiver 13 connects the knee positions in setting order, thereby subjecting 0 to 40%, 40 to 100%, 100 to 180%, and 180 to 400% of the luminance of the high dynamic range image obtained as the result of the decoding to the knee conversion into 0 to 60%, 60 to 80%, 80 to 90%, and 90 to 100%. As a result, the television receiver 13 can convert the high dynamic range image obtained as the result of the decoding into the desired second dynamic range image.

As described above, when a plurality of knee positions is set, the conversion rate can be set more minutely than that set when one knee position is set. Therefore, the knee conversion can be performed with higher accuracy. Depending on the transmission line, however, if there is no transmission capacity that allows a plurality of items of knee position information to be transmitted at one time, not all the items of knee position information might be transmitted when the setting is performed in order of the before-conversion position as mentioned above.

The present technology proposes a system and method for calculating and obtaining the priority order of the items of knee position information and setting the items of knee position information in this order when the items of knee position information are transmitted via a transmission line having a limited transmission capacity.

Figure 4:
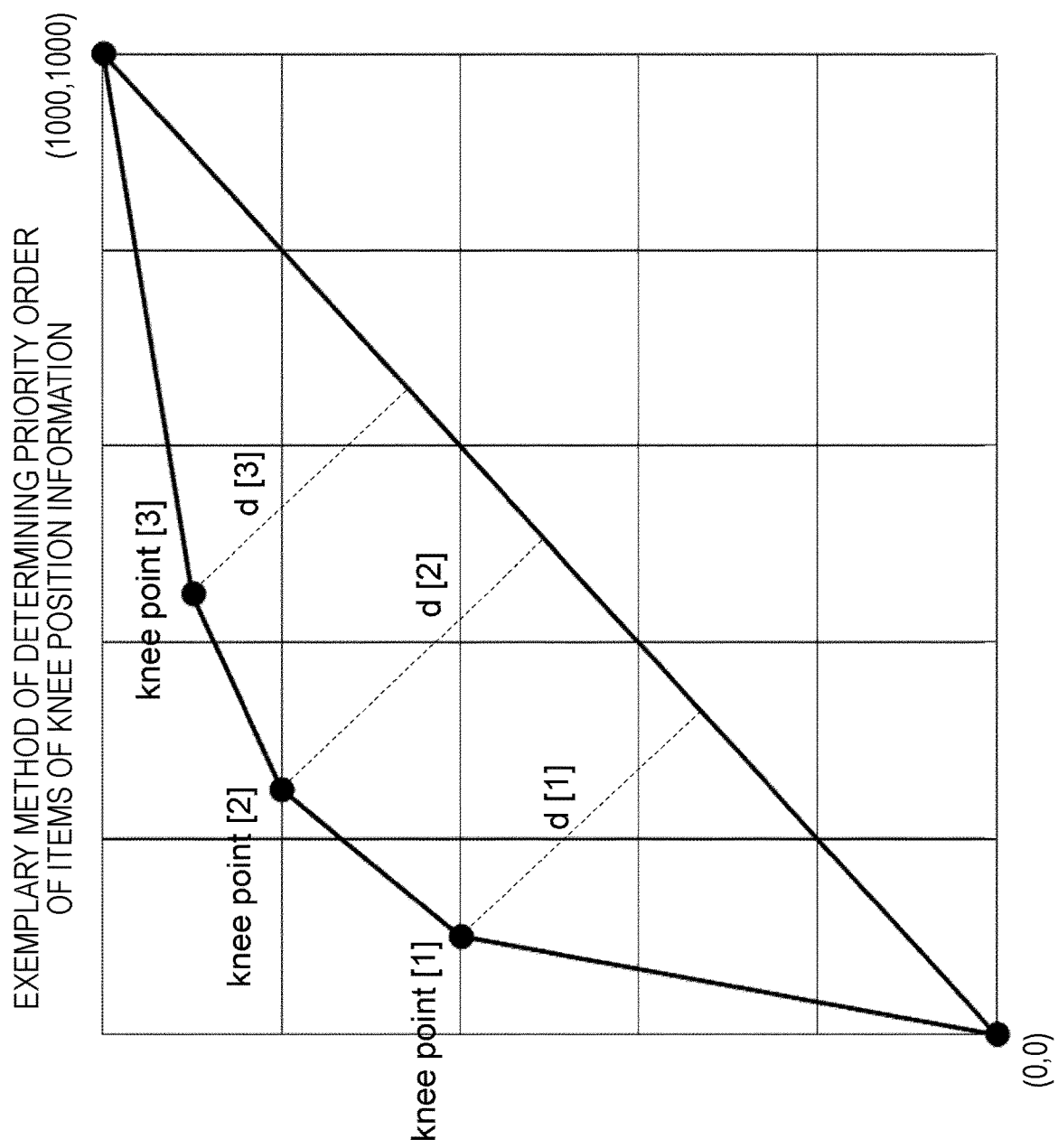
FIG. 4 is a diagram explaining a method of determining priority order of items of knee position information.

FIG. 1 is a diagram illustrating an example of the system and method for determining the priority order. A diagonal line is drawn from the origin (0, 0) of a conversion curve graph to a point (1000, 1000). A perpendicular line is drawn down to the diagonal line from each knee position. A length of each perpendicular line is calculated, and the priority order is determined to be high in descending order of the value. In FIG. 4, the length of each perpendicular line is long in order of d [2]>d [1]>d [3], and the before-conversion position information and the after-conversion position information of the knee function info SEI can be described in order of (250, 600), (100, 600), and (450, 900). In this case, the priority order of the plurality of items of knee position information is determined on the basis of a compression/ extension rate of the knee position indicated by each of the plurality of items of knee position information.

If at least one item of knee position information is acquired using this system and method, an approximate curve can be estimated although there is some error.

"Exemplary Configuration of HDMI Transmission Line"

Figure 5:
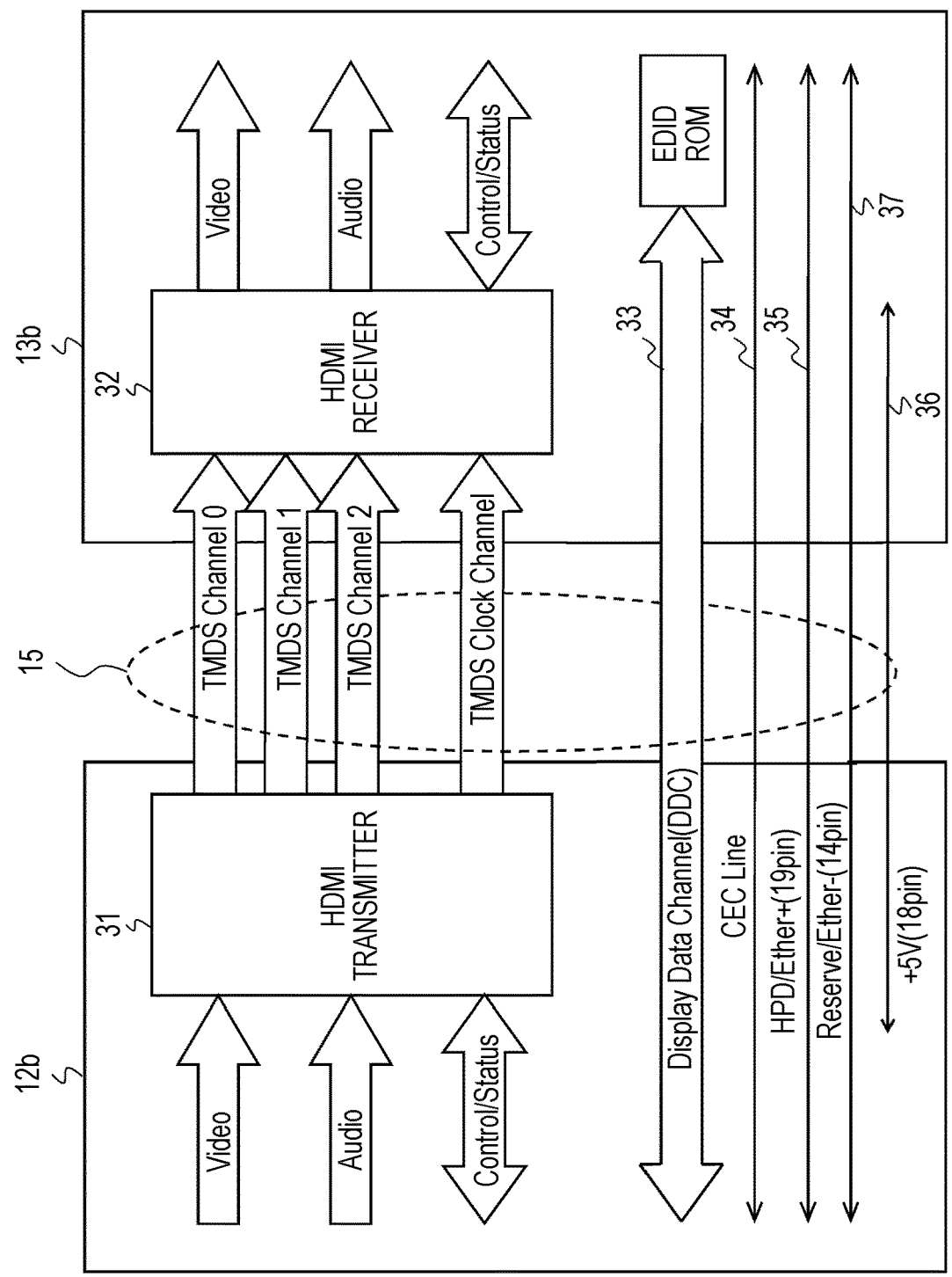
FIG. 5 is a block diagram illustrating an exemplary configuration of an HDMI sending unit of a BD player and an HDMI receiving unit of a television receiver.

FIG. 5 is a diagram illustrating an exemplary configuration of the HDMI sending unit 12b of the BD player 12 and the HDMI receiving unit 13b of the television receiver 13 in the AV system 10 of FIG. 1. In a valid image period 21 (hereinafter appropriately referred to as an "active video period") (refer to FIG. 6) obtained by removing a horizontal blanking period 22 and a vertical blanking period 23 from a period from one vertical synchronizing signal to the next vertical synchronizing signal, the HDMI sending unit 12b sends a differential signal corresponding to pixel data of an image of one uncompressed screen to the HDMI receiving unit 13b in one direction through a plurality of channels. In addition, in the horizontal blanking period 22 or the vertical blanking period 23, the HDMI sending unit 12b sends a differential signal corresponding to at least audio data accompanying the image, control data, and other auxiliary data or the like to the HDMI receiving unit 13b in the one direction through the plurality of channels.

In other words, the sending unit 12b has an HDMI transmitter 31. For example, the transmitter 31 converts the pixel data of the uncompressed image into the corresponding differential signal, and serially transmits the differential signal to the HDMI receiving unit 13b in the one direction through the plurality of channels, that is, three transition minimized differential signaling (TMDS) channels #0, #1, and #2.

In addition, the transmitter 31 also converts the audio data accompanying the uncompressed image, and required control data and other auxiliary data or the like into the corresponding differential signal, and serially transmits the differential signal to the HDMI receiving unit 13b in the one direction through the three TMDS channels #0, #1, and #2.

In the active video period 21 (refer to FIG. 6), the HDMI receiving unit 13b receives the differential signal corresponding to the pixel data sent from the HDMI sending unit 12b in the one direction through the plurality of channels. In addition, in the horizontal blanking period 22 (refer to FIG. 6) or the vertical blanking period 23 (refer to FIG. 6), the HDMI receiving unit 13b receives the differential signal corresponding to the audio data and the control data sent from the HDMI sending unit 12b in the one direction through the plurality of channels.

A transmission channel of an HDMI system having the HDMI source sending unit 12b and the HDMI receiving unit 13b includes the three TMDS channels #0 to #2 serving as transmission channels for transmitting the pixel data and the audio data, and a TMDS clock channel serving as a transmission channel for transmitting a pixel clock. In addition, the transmission channel further includes transmission channels called a display data channel (DDC) 33 and a consumer electronics control (CFC) line 34.

The DDC 33 includes two signal lines contained in the HDMI cable 15, and is used when the HDMI sending unit 12b reads enhanced extended display identification data (E-EDID) from the HDMI receiving unit 13b coupled via the HDMI cable 15. Specifically, the HDMI receiving unit 13b has, in addition to an HDMI receiver 32, an EDID read only memory (ROM) that stores the E-EDID, i.e., performance information about performance (configuration and capability) of the HDMI receiving unit 13b itself.

The HDMI sending unit 12b reads the E-EDID of the HDMI receiving unit 13b from the HDMI receiving unit 13b coupled via the HDMI cable 15 through the DDC 33. Then, the HDMI sending unit 12b recognizes, based on the E-EDID, setting of the performance of the HDMI receiving unit 13b, that is, for example, an image format (profile) which an electronic device having the HDMI receiving unit 13b supports, such as, for example, RGB, YCbCr 4:4:4, and YCbCr 4:2:2.

The CEC line 34 includes one signal line contained in the HDMI cable 15, and is used when bidirectional communication of controlling data is performed between the HDMI sending unit 12b and the HDMI receiving unit 13b. In addition, the HDMI cable 15 also includes an HPD line 35 connected to a pin called hot plug detect (HPD).

Using the HPD line 35, the source device can detect connection of the sink device by means of a DC bias potential. In this case, in terms of the source device, the HPD line 35 has a function to receive a notification of a connection state from the sink device by means of the DC bias potential. Meanwhile, in terms of the sink device, the HPD line has a function to notify the source device of the connection state by means of the DC bias potential.

In addition, the HDMI cable 15 also includes a line (power source line) 36 that is Used for supplying power from the source device to the sink device. Furthermore, the HDMI cable 15 further includes a reserve line 37. The HPD line 35 and the reserve line 37 are sometimes used to constitute a pair of differential transmission lines, which is used as a bidirectional communication channel.

Figure 6:
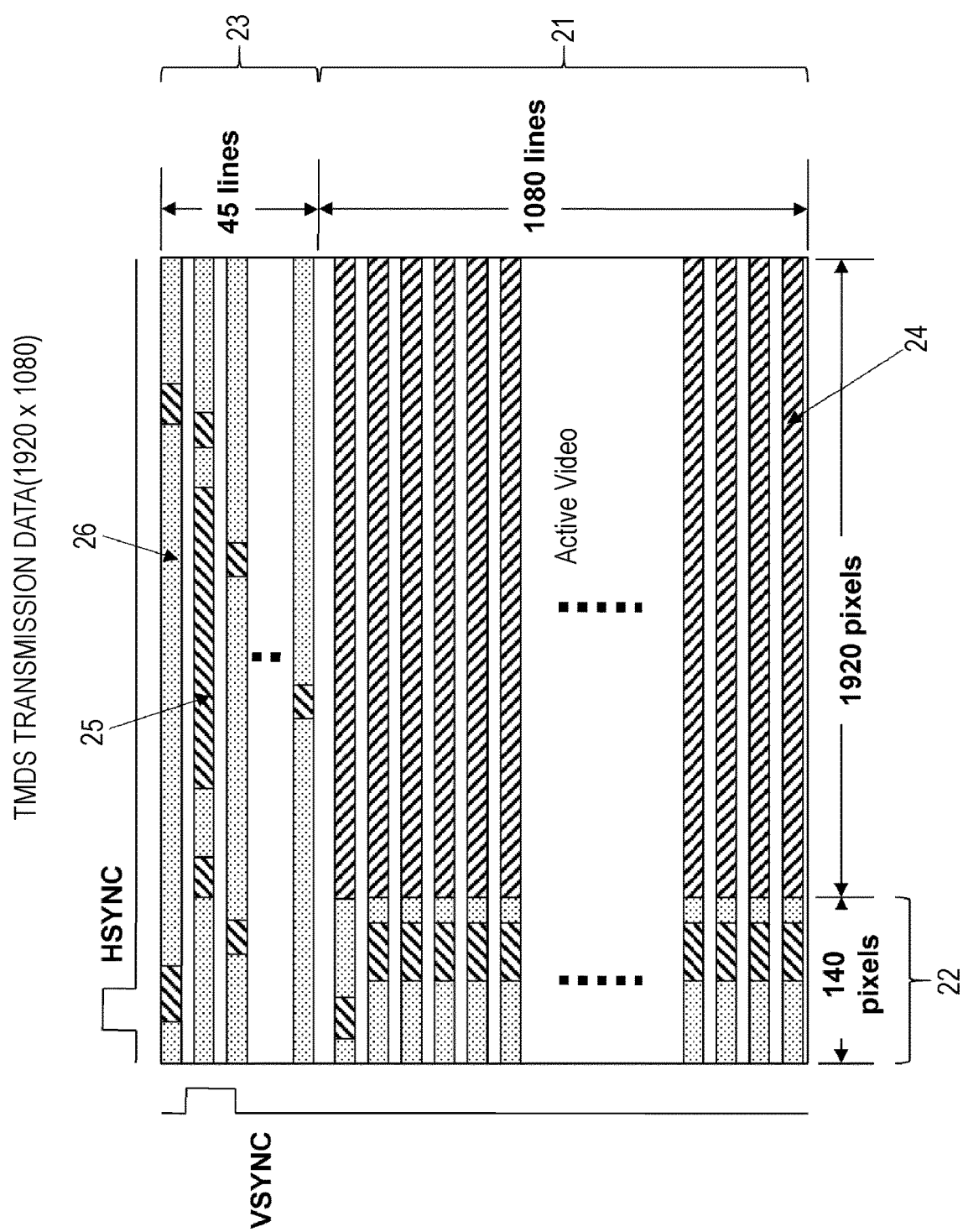
FIG. 6 is a diagram illustrating various periods of transmission data used when image data of 1920 pixels wide× 1080 lines long are transmitted through TMDS channels #0, #1, and #2.

FIG. 6 is a diagram illustrating various periods of transmission data used when image data of 1920 pixels wide× 1080 lines long are transmitted through the TMDS channels. In a video field for transferring the transmission data through the three HDMI TMDS channels, three kinds of periods, that is, a video data period 24, a data island period 25, and a control period 26, exist in accordance with a kind of the transmission data.

A video field period is a period from a rising edge (active edge) of a certain vertical synchronizing signal to a rising edge of the next vertical synchronizing signal. The video field period can be separated into the horizontal blanking interval 22 (horizontal blanking), the vertical blanking interval 23 (vertical blanking), and the valid pixel period 21 (active video) that is a period obtained by removing the horizontal blanking interval and the vertical blanking interval from the video field period.

The video data period 24 is assigned to the valid pixel period 21. In the video data period 24, data of valid pixels (active pixels) of 1920 pixels×1080 tines constituting the image data of the uncompressed one screen are transmitted. The data island period 25 and the control period 26 are assigned to the horizontal blanking interval 22 and the vertical blanking interval 23. In the data island period 25 and the control period 26, auxiliary data are transmitted.

In other words, the data island period 25 is assigned to a part of the horizontal blanking interval 22 and the vertical blanking interval 23. In the data island period 25, auxiliary data which are not related to control, e.g., a packet of audio data or the like, are transmitted. The control period 26 is assigned to the other part of the horizontal blanking interval 22 and the vertical blanking interval 23. In the control period 26, auxiliary data which are related to control, e.g., a vertical synchronizing signal, a horizontal synchronizing signal, and a control packet or the like, are transmitted.

[Exemplary Configuration of Digital Camera]

Figure 7:
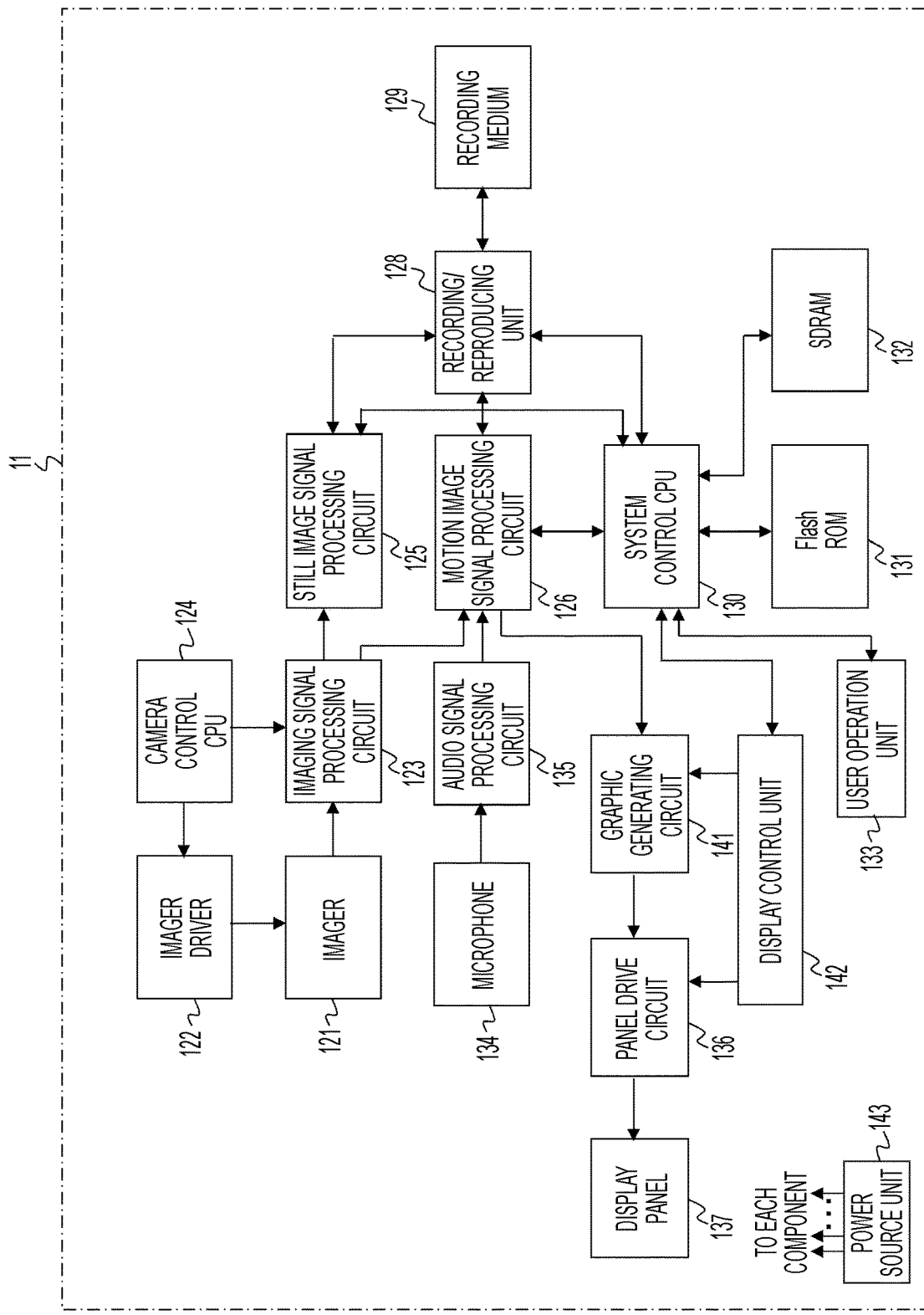
FIG. 7 is a block diagram illustrating an exemplary detailed configuration of a digital camera.

FIG. 7 is a diagram illustrating an exemplary detailed configuration of the digital camera 11. The digital camera 11 has an imager 121, an imager driver 122, an imaging signal processing circuit 123, a camera control CPU 124, a still image signal processing circuit 125, a motion image signal processing circuit 126, a recording/reproducing unit 128, and a recording medium 129.

In addition, the digital camera 11 also has a system control CPU 130, a flash ROM 131, an SDRAM 132, a user operation unit 133, a microphone 134, an audio signal processing circuit 135, a graphic generating circuit 141, a panel drive circuit 136, a display panel 137, a display control unit 142, and a power source unit 143.

The imager 121 includes, for example, a CMOS image sensor or a CCD image sensor. The imager driver 122 drives the imager 121. The imaging signal processing circuit 123 processes an imaging signal obtained by the imager 121 and generates image data (captured image data) corresponding to an object. The camera control CPU 124 controls operation of each of the imager driver 22 and the imaging signal processing circuit 123. Note that although the illustrated example includes the camera control CPU 124 as well as the system control CPU 130, the camera control CPU 124 and the system control CPU 130 may be contained in a single chip or configured as a plurality of cores.

When a still image is captured, the still image signal processing circuit 125 subjects the image data obtained by the imaging signal processing circuit 123 to, for example, a compression encoding process in a joint photographic experts group (JPEG) format. The still image signal processing circuit 125 thus generates still image data.

The audio signal processing circuit 135 subjects an audio signal obtained by the microphone 134 to a process such as an A/D conversion, and obtains audio data corresponding to captured image data. When a motion image is captured, the motion image signal processing circuit 126 subjects the image data obtained by the imaging signal processing circuit 123 together with the audio data obtained by the audio signal processing circuit 125 to a process such as compression encoding that conforms to a recording medium format. The motion image signal processing circuit 126 thus generates motion image data to which the audio data have been added.

In the motion image signal processing circuit 126, for example, HEVC encoding is performed. In the motion image signal processing circuit 126, the above-mentioned processes of the setting unit 11c and the conversion unit 11b are also performed. Specifically, the first dynamic range image captured by the imager 121 is converted into the second dynamic range image, and the second dynamic range image is encoded, whereby the encoded data are generated. Then, the conversion information (knee function info SEI) from the first dynamic range image to the second dynamic range image is added to the encoded data. In the conversion information, the plurality of items of knee position information is included, with the priority order given to the plurality of items of knee position information.

When a still image is captured, the recording/reproducing unit 128 writes the still image data generated by the still image signal processing circuit 125 to the mounted recording medium (storage medium) 129 or to the flash ROM 131 through the system control CPU 130. The recording medium 129 is, for example, a removable recording medium, e.g., a BD disc and a memory card or the like. In addition, when a motion image is captured, the recording/reproducing unit 128 writes the motion image data generated by the motion image signal processing circuit 126 to the mounted recording medium 129 or to the flash ROM 131 through the system control CPU 130. Furthermore, when a still image or a motion image is reproduced, the recording/reproducing unit 128 reads the motion image data from the recording medium 129, subject the motion image data to a decoding process or the like, and obtains reproduced image data.

The graphic generating circuit 141 performs, as necessary, a superposing process for graphics data on the image data output from the imaging signal processing circuit 123 or on the reproduced image data generated by the recording/reproducing unit 128. The panel drive circuit 136 drives the panel 137 on the basis of the output image data from the graphic generating circuit 141, and displays a captured mage (motion image) or a reproduced image (still image and motion image) on the display panel 137. The display control unit 142 controls the graphics generating circuit 141 and the panel drive circuit 136 to control the display on the display panel 137. The display panel 137 includes, for example, a liquid crystal display (LCD) and an organic electro-luminescence (organic EL) panel or the like.

Note that although the illustrated example includes the display control unit 142 as well as the system control CPU 130, the system control CPU 130 may directly control the display on the display panel 137. In addition, the system control CPU 130 and the display control unit 142 may be contained in a single chip or configured as a plurality of cores. The power source unit 143 supplies power to each component of the digital camera 11. The power source unit 143 may be an AC power source or a battery (storage battery or dry battery).

The system control CPU 130 controls operation of each of the still image signal processing circuit 125, the motion image signal processing circuit 126, and the recording/reproducing unit 128 or the like. The flash ROM 131, the SDRAM 132, and the user operation unit 133 are connected to the system control CPU 130. The flash ROM 131 stores a control program or the like of the system control CPU 130. In addition, the SDRAM 132 is used for, for example, temporary storage of data that are required for a control process of the system control CPU 130.

The user operation unit 133 constitutes a user interface Note that the user operation unit 133 may be, for example, a switch, a wheel, a touch panel unit through which instruction input is performed by proximity/touch, a mouse, a keyboard, a gesture input unit that detects instruction input by means of a camera, an audio input unit through which instruction input is performed by audio, and a remote control or the like. The system control CPU 130 determines an operation state of the user operation unit 133 to control operation of the digital camera 11. A user can perform, for example, input operation of various types of additional information in addition to imaging (recording) operation and reproducing operation by means of the user operation unit 133.

The operation of the digital camera 11 illustrated in FIG. 7 will be briefly described. The imaging signal obtained by the imager 121 is supplied to and processed by the imaging signal processing circuit 123. The image data (captured image data) corresponding to an object are obtained from the imaging signal processing circuit 123. When a still image is captured, in the still image signal processing circuit 125, the compression encoding process or the like is performed on the image data output from the imaging signal processing circuit 123, and the still image data are generated. The still image data are recorded in the recording medium 129 by the recording/reproducing unit 128.

In addition, when a motion image is captured, in the motion image signal processing circuit 126, the process such as the compression encoding that conforms to the recording medium format is performed on the image data output from the imaging signal processing circuit 123 together with the audio data output from the audio signal processing circuit 135, whereby the motion image data to which the audio data have been added are generated. The motion image data are recorded in the recording medium 129 by the recording/reproducing unit 128.

When a still image is reproduced, the still image data are read from the recording medium 129 and subjected to the process such as the decoding in the still image signal processing circuit 125, whereby the reproduced image data are obtained. The reproduced image data are supplied to the panel drive circuit 136 via the system control CPU 130 and the motion image signal processing circuit 126, and the still image is displayed on the display panel 137.

When a motion image is reproduced, the motion image data are read from the recording medium 129 by the recording/reproducing circuit 128, and subjected to the process such as the decoding in the motion image signal processing circuit 126, whereby the reproduced image data are obtained. Then, the reproduced image data are supplied to the panel drive circuit 136, and the motion image is displayed on the display panel 137.

[Exemplary Configuration of BD Player]

Figure 8:
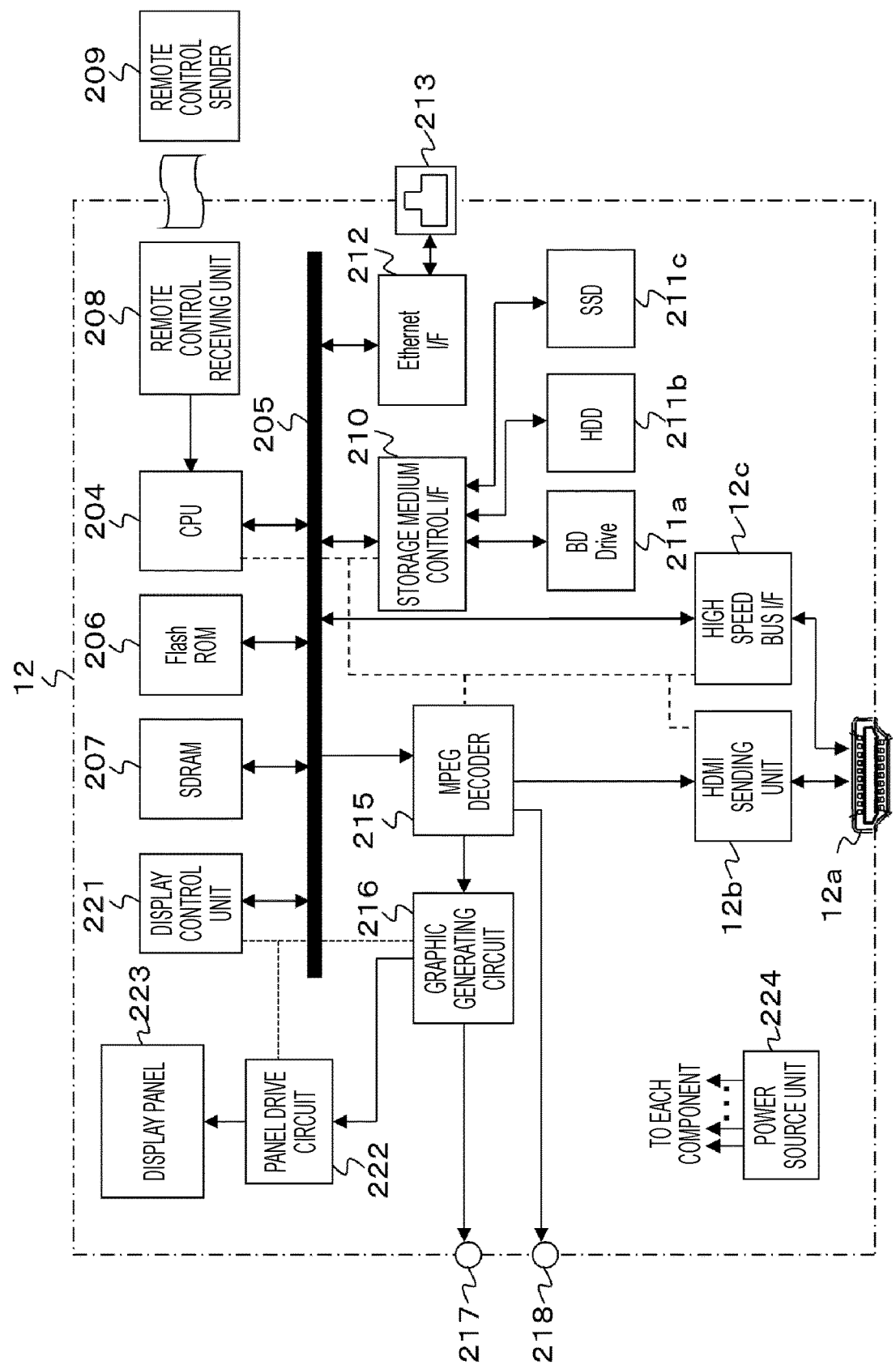
FIG. 8 is a block diagram illustrating an exemplary configuration of the BD player.

FIG. 8 is a diagram illustrating an exemplary configuration of the BD player 12. The BD player 12 has the HDMI terminal 12a, the HDMI sending unit 12b, and the high speed bus interface 12c. In addition, the BD player 12 also has a central processing unit (CPU) 204, an internal bus 205, a flash read only memory (ROM) 206, a synchronous random access memory (SDRAM) 207, a remote control receiving unit 208, and a remote control sender 209.

In addition, the BD player 12 also has a storage (recording) medium control interface 210, a Blu-Ray Disc (BD) drive 211a, a hard disk drive (HDD) 211b, a solid state drive (SSD) 211c, an Ethernet interface (Ethernet I/F) 212, and a network terminal 213. In addition, the BD player 12 also has a moving picture expert group (MPEG) decoder 215, a graphic generating circuit 216, a video output terminal 217, and an audio output terminal 218.

In addition, the BD player 12 may have a display control unit 221, a panel drive circuit 222, a display panel 223, and a power source unit 224. Note that the "Ethernet" is a registered trademark. The high speed bus interface 12c the CPU 204, the flash ROM 206, the SDRAM 207, the remote control receiving unit 208, the storage medium control interface 210, the Ethernet interface 212, and the MPEG decoder 215 are connected to the internal bus 205.

The CPU 204 controls operation of each component of the BD player 12. The flash ROM 206 accommodates control software and stores data. The SDRAM 207 constitutes a work area of the CPU 204. The CPU 204 expands software and data read from the flash ROM 206 on the SDRAM 207 to start the software, and controls each component of the BD player 12.

The remote control receiving unit 208 receives a remote control signal (remote control code) sent from the remote control sender 209, and supplies the remote control code to the CPU 204. The CPU 204 controls each component of the BD player 12 in accordance with the remote control code. Note that in the present embodiment, a remote control unit is described as a user instruction input unit. However, the user instruction input unit may be another configuration such as, for example, a switch, a wheel, a touch panel unit through which instruction input is performed by proximity/touch, a mouse, a keyboard, a gesture input unit that detects instruction input by means of a camera, and an audio input unit through which instruction input is performed by audio.

The BD drive 211a records content data in a BD disc serving as a disc-like recording medium, or reproduces the content data from the BD disc. The HDD 211b records content data or reproduces the content data. The SSD 211c records content data in a semiconductor memory such as a memory card, or reproduces the content data from the semiconductor memory.

The BD drive 211a, HDD 211b, and the SSD 211c are coupled to the internal bus 205 via the storage medium control interface 210. For example, a SATA interface is used as an interface for the BD drive 211a and the HDD 211b. In addition, for example, a SATA interface or PCIe interface is used as an interface for the SSD 211c.

The MPEG decoder 215 performs a decode process on an MPEG2 stream reproduced by the BD drive 211a, the HDD 211b, or the SSD 211c, and obtains image and audio data. The graphic generating circuit 216 performs, as necessary, a superposing process for graphics data on the image data obtained by the MPEG decoder 215. The video output terminal 217 outputs the image data output from the graphic generating circuit 216. The audio output terminal 218 outputs the audio data obtained by the MPEG decoder 215.

The panel drive circuit 222 drives the display panel 223 on the basis of the video (image) data output from the graphic generating circuit 216. The display control unit 221 controls the graphics generating circuit 216 and the panel drive circuit 222 to control the display on the display panel 223. The display panel 223 includes, for example, a liquid crystal display (LCD), a plasma display panel (PDP), and an organic electro-luminescence (organic EL) panel or the like.

Note that although the example illustrated in the present embodiment includes the display control unit 221 as well as the CPU 204, the CPU 204 may directly control the display on the display panel 223. In addition, the CPU 204 and the display control unit 221 may be contained in a single chip or configured as a plurality of cores. The power source unit 224 supplies power to each component of the BD player 12. The power source unit 224 may be an AC power source or a battery (storage battery or dry battery).

The HDMI sending unit (HDMI source) 12b exports baseband image (video) and audio data from the HDMI terminal 12a by means of communication that conforms to the HDMI. The high speed bus interface 12c is an interface for the bidirectional communication channel including a predetermined line (in the present embodiment, the reserve line and the HPD line) constituting the HDMI cable 15.

In the HDMI sending unit 12b, the above-mentioned processes of the information sending unit 12e and the information receiving unit 12f are also performed. Specifically, the encoded data of the second dynamic range image reproduced from the storage medium 14 from the digital camera 11 are decoded by the MPEG decoder 215 to obtain the uncompressed image data, and the conversion information of the uncompressed image data is sent to the television receiver 13. Then, the information of the number of knee positions which the television receiver 13 can deal with is received from the television receiver 13.

In a blanking interval of the uncompressed image data, the conversion information from the first dynamic range image to the second dynamic range image is inserted. The knee position information is included in the conversion information, but limited to the number of knee positions which the television receiver 13 can deal with. As described above, when the encoded data of the second dynamic range image are decoded by the MPEG decoder 215, the plurality of items of knee position information, with the priority order given to the plurality of items of knee position information, is extracted from the encoded data in the MPEG decoder 215.

In the HDMI sending unit 12b, from among the plurality of items of knee position information extracted in association with the uncompressed image data in the MPEG decoder 215 in the above-mentioned manner, the item of knee position information the number of which is equivalent to the number of knee positions which the television receiver 13 can deal with, is selected on the basis of the priority order. Then, the selected predetermined number of items of knee position information is included in the conversion information inserted in the blanking interval of the uncompressed image data that are sent to the television receiver 13.

The high speed bus interface 12c is inserted between the Ethernet interface 212 and the HDMI terminal 201. The high speed bus interface 12c sends sending data supplied from the CPU 204 from the HDMI terminal 201 to an opposite side device via the HDMI cable 15. In addition, the high speed bus interface 12c supplies, to the CPU 104, reception data received from the opposite side device from the HDMI cable 15 via the HDMI terminal 12a.

The operation of the SD player 12 illustrated in FIG. 6 will be briefly described. At the time of recording, the content data to be recorded are acquired via a digital tuner (not illustrated), via the Ethernet interface 212 from the network terminal 213, or via the high speed bus interface 12c from the HDMI terminal 12a. The content data are input to the storage medium interface 210 and recorded in a BD disc by the BD drive 211a, in the HDD 211b, or in a semiconductor memory by the SSD 211c.

At the time of reproduction, the content data (MPEG stream) reproduced by the BD drive 211a, the HDD 211b, or the SSD 211c are supplied to the MPEG decoder 215 via the storage medium interface 210. In the MPEG decoder 215, the decode process is performed on the reproduced content data, whereby the baseband image and audio data are obtained. The image data are output to the video output terminal 217 through the graphic generating circuit 216. In addition, the audio data are output to the audio output terminal 218.

In addition, at the time of the reproduction, the image data obtained by the MPEG decoder 215 are supplied to the panel drive circuit 222 through the graphic generating circuit 216 in accordance with user operation, and a reproduced image is displayed on the display panel 223. In addition, the audio data obtained by the MPEG decoder 115 are supplied to a speaker (not illustrated) in accordance with user operation, and audio corresponding to the reproduced image is output.

In addition, at the time of the reproduction, when the image and audio data obtained by the MPEG decoder 215 are sent through the HDMI TMDS channels, the image and audio data are supplied to the HDMI sending unit 12b, packed, and output from the HDMI sending unit 12b to the HDMI terminal 12a.

In addition, at the time of the reproduction, when the content data reproduced by the BD drive 211 are exported to a network, the content data are output to the network terminal 213 via the Ethernet interface 212. Similarly, at the time of the reproduction, when the content data reproduced by the BD drive 211 are exported to the bidirectional communication channel of the HDMI cable 15, the content data are output to the HDMI terminal 12a via the high speed bus interface 12c. Before the image data are output, the image data may be encrypted using a copyright protection technique, e.g., HDCP, DTCP, and DTCP+ or the like, to be transmitted.

[Exemplary Configuration of Television Receiver]

Figure 9:
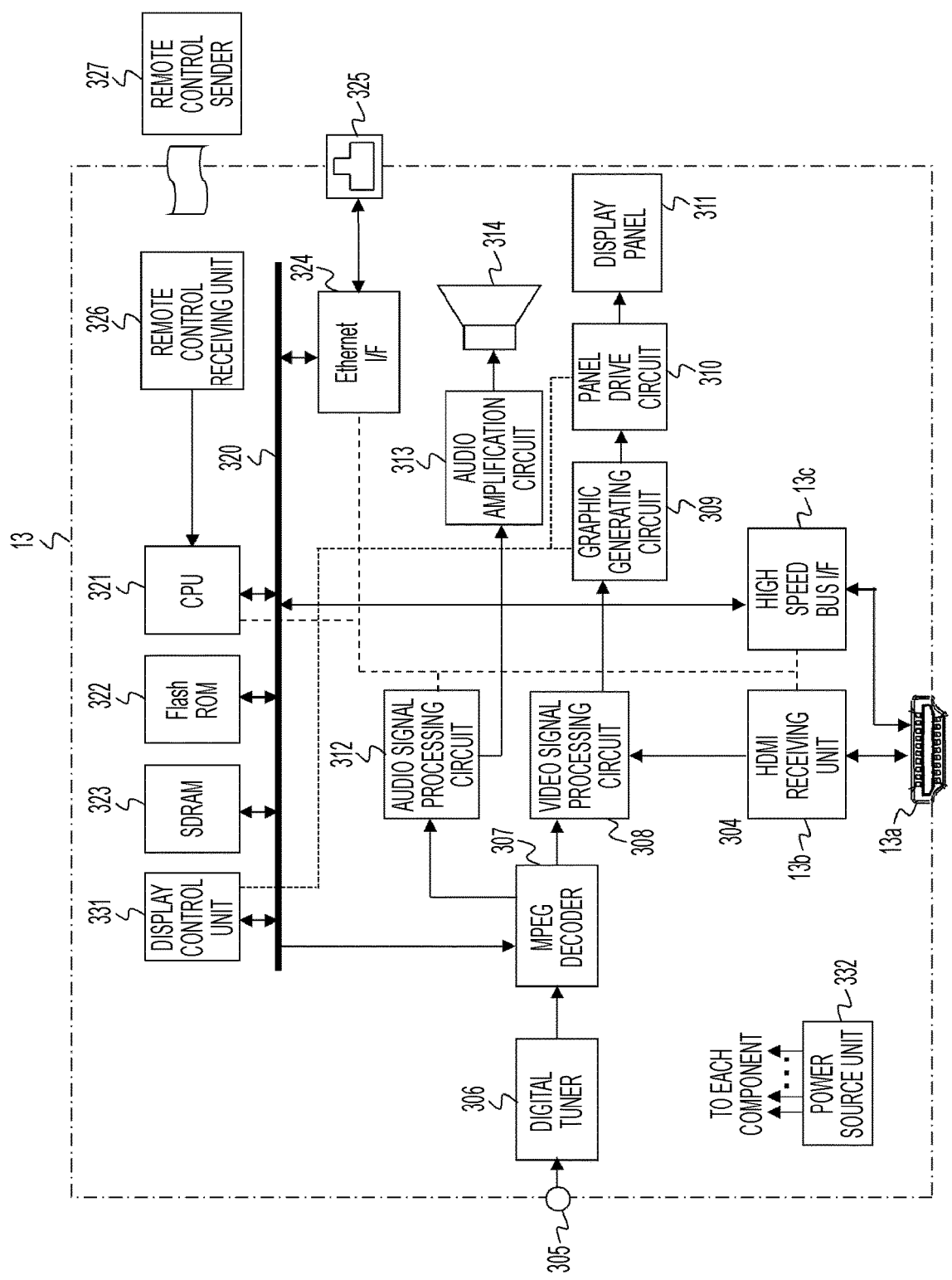
FIG. 9 is a block diagram illustrating an exemplary configuration of the television receiver.

FIG. 9 is a diagram illustrating an exemplary configuration of the television receiver 13. The television receiver 13 has the HDMI terminal 13a, the HDMI receiving unit 13b, and the high speed bus interface 13c. In addition, the television receiver 13 also has an antenna terminal 305, a digital tuner 306, an MPEG decoder 307, a video signal processing circuit 308, a graphic generating circuit 309, a panel drive circuit 310, and a display panel 311.

In addition, the television receiver 13 also has an audio signal processing circuit 312, an audio amplification circuit 313, a speaker 314, an internal bus 320, a CPU 321, a flash ROM 322, and a synchronous random access memory (SDRAM) 323. In addition, the television receiver 13 also has an Ethernet interface (Ethernet I/F) 324, a network terminal 325, a remote control receiving unit 326, and a remote control sender 327. In addition, the television receiver 13 also has a display control unit 331 and a power source unit 332. Note that the "Ethernet" is a registered trademark.

The antenna terminal 305 is a terminal through which a television broadcasting signal received by a reception antenna (not illustrated) is input. The digital tuner 306 processes the television broadcasting signal input to the antenna terminal 305, and extracts a partial transport stream (TS) (TS packet of video data and TS packet of audio data) from a predetermined transport stream corresponding to a channel selected by a user.

In addition, the digital tuner 306 also retrieves program specific information/service information (PSI/SI) from the obtained transport stream, and outputs the PSI/SI to the CPU 221. The process of extracting a partial TS of an arbitrary channel from a plurality of transport streams obtained by the digital tuner 306 is enabled by obtaining information of a packet ID (PID) of the arbitrary channel from the PSI/SI (PAT/PMT).

The MPEG decoder 307 performs a decode process on a video packetized elementary stream (PES) packet including the TS packet of the video data obtained by the digital tuner 306, and obtains image data. In addition, the MPEG decoder 307 also performs a decode process on an audio PES packet including the TS packet of the audio data obtained by the digital tuner 306, and obtains audio data.

The video signal processing circuit 308 and the graphic generating circuit 309 perform, as necessary, a scaling process (resolution conversion process) and a superposing process for graphics data or the like on the image data obtained by the MPEG decoder 307 or on image data received by the receiving unit 302.

The panel drive circuit 310 drives the display panel 311 on the basis of the video (image) data output from the graphic generating circuit 309. The display control unit 331 controls the graphics generating circuit 309 and the panel drive circuit 310 to control the display on the display panel 311. The display panel 311 includes, for example, a liquid crystal display (LCD), a plasma display panel (PDP), and an organic electro-luminescence (organic EL) panel or the like.

Note that although the example illustrated in the present embodiment includes the display control unit 331 as well as the CPU 321, the CPU 221 may directly control the display on the display panel 311. In addition, the CPU 32 and the display control unit 331 may be contained in a single chip or configured as a plurality of cores. The power source unit 332 supplies power to each component of the television receiver 13. The power source unit 332 may be an AC power source or a battery (storage battery or dry battery).

The audio signal processing circuit 312 performs a necessary process such as a D/A conversion on the audio data obtained by the MPEG decoder 307. The audio amplification circuit 313 amplifies an audio signal output from the audio signal processing circuit 312 and supplies the amplified audio signal to the speaker 314. Note that the speaker 314 may be monaural or stereo. In addition, the speaker 314 may be a single speaker or two or more speakers. In addition, the speaker 314 may be an earphone or a headphone. In addition, the speaker 314 may conform to 2.1 channel, 5.1 channel or the like. In addition, the speaker 314 may be wirelessly connected to the television receiver 13. In addition, the speaker 314 may be another device.

The CPU 321 controls operation of each component of the television receiver 13. The flash ROM 322 accommodates control software and stores data. The DRAM 323 constitutes a work area of the CPU 321. The CPU 321 expands software and data read from the flash ROM 322 on the SDRAM 323 to start the software, and controls each component of the television receiver 13.

The remote control receiving unit 326 receives a remote control signal (remote control code) sent from the remote control sender 327, and supplies the remote control code to the CPU 321. The CPU 321 controls each component of the television receiver 13 on the basis of the remote control code. Note that in the present embodiment, a remote control unit is described as a user instruction input unit. However, the user instruction input unit may be another configuration such as, for example, a touch panel unit through which instruction input is performed by proximity/touch, a mouse, a keyboard, a gesture input unit that detects instruction input by means of a camera, and an audio input unit through which instruction input is performed by audio.

The network terminal 325 is a terminal connected to the network and is connected to the Ethernet interface 324. The high speed bus interface 13c, the CPU 321, the flash ROM 322, the SDRAM 323, the Ethernet interface 324, the MPEG decoder 307, and the display control unit 331 are connected to the internal bus 320.

The HDMI receiving unit (HDMI sink) 13b receives, by means of communication that conforms to the HDMI, baseband image (video) and audio data supplied to the HDMI terminal 13a via the HDMI cable 13. In a similar way to the high speed bus interface 13c of the above-mentioned BD player 12, the high speed bus interface 13c is an interface for the bidirectional communication channel including a predetermined line (in the present embodiment, the reserve line and the HPD line) constituting the HDMI cable 15.

In the HDMI receiving unit 13b, the above-mentioned processes of the information receiving unit 13e and the information sending unit 13f are also performed. Specifically, the information of the number of knee positions which the television receiver 13 itself can deal with is sent to the BD player 12. The information of the number of knee positions which the television receiver 13 itself can deal with is stored in an EDID-ROM within the HDMI receiving unit 13b. In addition, the conversion information from the first dynamic range image to the second dynamic range image inserted in the blanking interval of the uncompressed image data received from the BD player 12 is extracted. The item of knee position information, the number of which is equivalent to the number of knee positions which the television receiver 13 itself can deal with, is included in the conversion information. In the video signal processing circuit 308, process of dynamic range conversion is performed on the uncompressed image data received by the HDMI receiving unit 13b on the basis of the knee position information.

The high speed bus interface 13c is inserted between the Ethernet interface 324 and the HDMI terminal 301. The high speed bus interface 13c sends sending data supplied from the CPU 321 from the HDMI terminal 13a to an opposite side device via the HDMI cable 15. In addition, the high speed bus interface 13c supplies, to the CPU 321, reception data received from the opposite side device from the HDMI cable 15 via the HDMI terminal 13a.

Note that for example, when the received content data are exported to the network, the content data are output to the network terminal 325 via the Ethernet interface 324. Similarly, when the received content data are exported to the bidirectional communication channel of the HDMI cable 15, the content data are output to the HDMI terminal 13a via the high speed bus interface 13c. Before the image data are output, the image data may be encrypted using a copyright protection technique, e.g., HDCP, DTCP, and DTCP+ or the like, to be transmitted.

The operation of the television receiver 13 illustrated in FIG. 9 will be briefly described. The television broadcasting signal input to the antenna terminal 305 is supplied to the digital tuner 306. In the digital tuner 306, the television broadcasting signal is processed, and the predetermined transport stream corresponding to the channel selected by the user is output. The partial TS (TS packet of video data and TS packet of audio data) is then extracted from the transport stream, and the partial TS is supplied to the MPEG decoder 307.

In the MPEG decoder 307, the decode process is performed on the video PES packet including the TS packet of the video data, whereby the video data are obtained. The video data are subjected to, as necessary, the scaling process (resolution conversion process), the dynamic range process, and the superposing process for graphics data or the like in the video signal processing circuit 308 and the graphic generating circuit 309. After that, the video data are supplied to the panel drive circuit 310. Therefore, an image corresponding to the channel selected by the user is displayed on the display panel 311.

In addition, in the MPEG decoder 307, the decode process is performed on the audio PES packet including the TS packet of the audio data, whereby the audio data are obtained. The audio data are subjected to the necessary process such as the D/A conversion in the audio signal processing circuit 312, and further amplified in the audio amplification circuit 313. After that, the audio data are supplied to the speaker 314. Therefore, audio corresponding to the channel selected by the user is output from the speaker 314.

In addition, the content data (image data and audio data) supplied from the network terminal 325 to the Ethernet interface 324 or supplied from the HDMI terminal 13a via the high speed bus interface 13c are supplied to the MPEG decoder 307. Subsequently, operation similar to the above-mentioned operation performed at the time of receiving the television broadcasting signal is performed, namely, an image is displayed on the display panel 311 and audio is output from the speaker 314.

In addition, in the HDMI receiving unit 13b, the image data and the audio data sent from the BD player 12 coupled to the HDMI terminal 13a via the HDMI cable 15 are acquired. The image data are supplied to the video signal processing circuit 308. In addition, the audio data are supplied to the audio signal processing circuit 312. Subsequently, operation similar to the above-mentioned operation performed at the time of receiving the television broadcasting signal s performed, namely, an image is displayed on the display panel 311 and audio is output from the speaker 314.

"Exemplary Control Between Devices by Knee Position Information"

In the present embodiment, the BD player 12 receives, from the television receiver 13 via the HDMI cable 15, the information of the number of knee positions which the television receiver 13 can deal with. In this case, the television receiver 13 stores, in the storage unit, the information of the number of knee positions which the television receiver 13 itself deals with, and sends the information of the number of knee positions to the BD player 12 via the HDMI cable 15. Note that conventionally, there has been no specification for designating the number of items of knee position information, and there has been no compatibility between manufacturers.

On the basis of the information of the number of knee positions received from the television receiver 13, the BD player 12 selects, from among the plurality of items of knee position information acquired in the MPEG decoder 215 together with the uncompressed image data, the item of knee position information, the number of which is equivalent to the number which the television receiver can deal with. The BD player 12 then sends the selected item of knee position information to the television receiver 13 via the HDMI cable 15. In this case, the priority order is given to the plurality of items of knee position information-acquired by the MPEG decoder 215, and the selection is performed in the priority order.

The television receiver 13 receives, from the BD player 12 via the HDMI cable 15, the uncompressed image data and the conversion information including the item of knee position information, the number of which is equivalent to the number which the television receiver 13 can deal with. The television receiver processes the received uncompressed image data on the basis of the received conversion information to generate the image data for display.

[Exemplary Data Structure of EDID]

Figure 10:
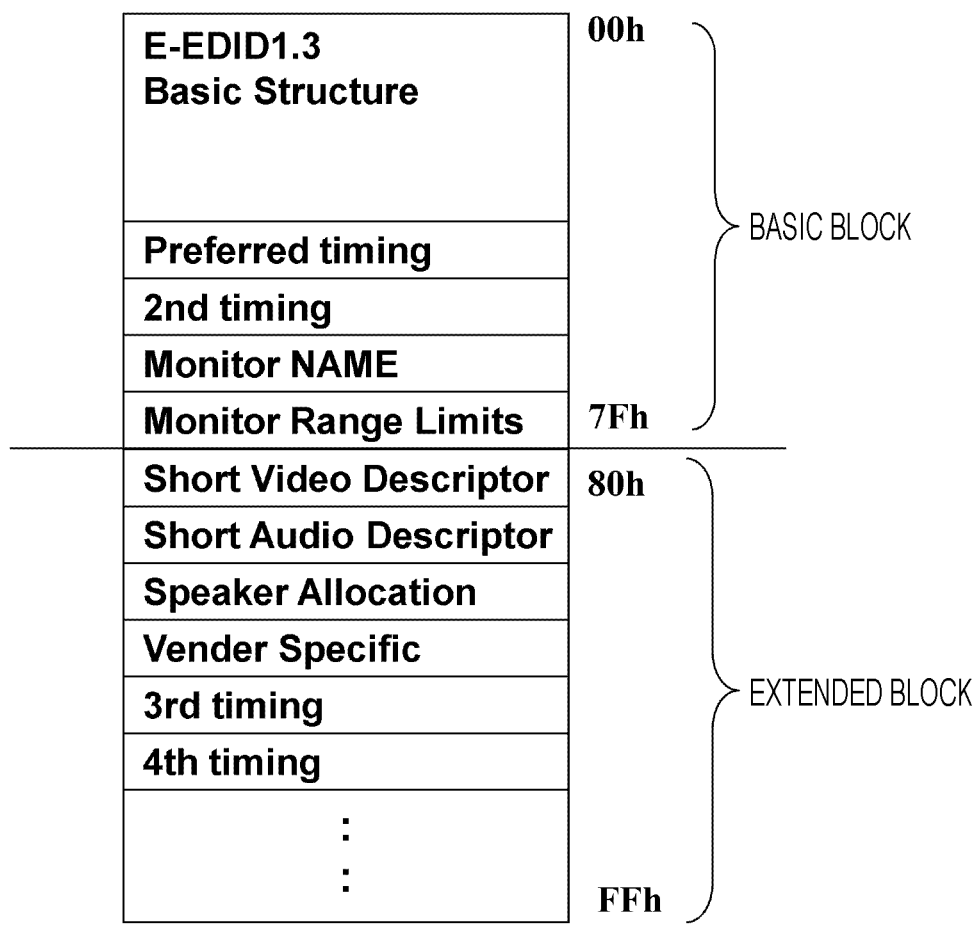
FIG. 10 is a diagram illustrating an exemplary data structure of E-EDID stored in the television receiver.

FIG. 10 is a diagram illustrating an exemplary data structure of the E-EDID. The E-EDID includes a basic block and an extended block. At the top of the basic block, data represented by "E-EDID 1.3 Basic Structure" defined by a standard of E-EDID 1.3 are arranged. Subsequently, timing information represented by "Preferred timing" for maintaining compatibility with conventional EDID is arranged, and timing information represented by "2nd timing", which is different from the "Preferred timing", for maintaining the compatibility with the conventional EDID is arranged.

In addition, in the basic block, subsequently to the "2nd timing", information represented by "Monitor NAME" indicating a name of a display device, and information represented by "Monitor Range Limits" indicating the number of pixels that can be displayed when an aspect ratio is 4:3 and 16:9 are arranged in order.

At the top of the extended block, data represented by "Short Video Descriptor" describing information such as an image size (resolution) that can be displayed, a frame rate, information as to either an interlace system or a progressive system, and an aspect ratio, data represented by "Short Audio Descriptor" describing information such as an audio codec system that can be reproduced, a sampling frequency, a cutoff band, and codec bit number, and information represented by "Speaker Allocation" about left and right speakers are arranged in order.

In addition, in the extended block, subsequently to the "Speaker Allocation", data represented by "Vender Specific" uniquely defined for each manufacturer, timing information represented by "3rd timing" for maintaining the compatibility with the conventional EDID, and timing information represented by "4th timing" for maintaining the compatibility with the conventional EDID are arranged.

[Exemplary Data Structure of Vendor Specific Data Block (VSDB) Region]

In the present embodiment, a data area that is extended for storing the information of the number of knee positions which the television receiver 13 can deal with is defined in the VSDB region. FIG. 11 is a diagram illustrating an exemplary data structure of the VSDB region. In the VSDB region, zeroth n-th blocks, each of which is a one-byte block, are provided.

A flag about the presence or absence of the information of the number of knee positions is defined in a fourth bit of the eighth byte, and a data region of the information of the number of knee positions to be stored in the television receiver 13 is defined in the ninth byte.

First, the zeroth to eighth bytes will be described. In the zeroth byte arranged at the top of the data represented by the "Vender Specific", a header represented by "Vendor-Specific tag code (=3)" indicating a data region and information represented by "Length (=N)" indicating a length of VSDB data are arranged. In addition, in the first to third bytes, information represented by "24 bit IEEE Registration identifier (0x000C03) LSB first" indicating a number "0x000C03" registered for HDMI® is arranged.

Furthermore, in the fourth and fifth bytes, information represented by each of "A", "B", "C", and "D" indicating a physical address of a 24-bit sink device is arranged. In the sixth byte, a flag represented by "Supports-AI" indicating a function which the sink device supports, respective items of information represented by "DC-48 bit", "DC-36 bit", and "DC-30 bit" designating bit number per one pixel, a flag represented by "DC-Y444" indicating whether the sink device supports transmission of an image of YCbCr 4:4:4, and a flag represented by "DVI-Dual" indicating whether the sink device supports a dual digital visual interface (DVI) are arranged.

In addition, in the seventh byte, information represented by "Max-TMDS-Clock" indicating a maximum frequency of a TMDS pixel clock is arranged. In third to zeroth bits of the eighth byte, a flag of information designating support for a function of a content type (CNC) is arranged. In the fourth bit of the eighth byte, a flag indicating whether the information of the number of knee positions which the sink device deals with exists is newly arranged. When this flag is a high level "1", it is indicated that the information of the number of knee positions and a supported packet form information "DRIF" flag exit in the ninth byte.

In this example, a method for storing the information of the number of knee positions using the VSDB region is proposed. The E-EDID data structure, however, can also be realized by other data regions such as, for example, a video capability data block (VCDB) Therefore, the present invention is not limited to this method.

In the AV system 10 illustrated in FIG. 1, the BD player (HDMI source device) 12 confirms connection of the television receiver (HDMI sink device) 13 by means of the HPD line 35 (refer to FIG. 5). After that, the BD player 12 reads the E-EDID, i.e., the information of the number of knee positions, from the television receiver 13 using the DDC 33

(refer to FIG. 5), and recognizes the number of knee positions which the television receiver 13 deals with.

In the AV system 10 illustrated in FIG. 1, when the uncompressed image data are transmitted to the television receiver 13, the BD player 12 transmits, to the television receiver 13, the dynamic range conversion information including the item of knee position information, the number of which is equivalent to the number which the television receiver 13 can deal with, on the basis of the information of the number of knee positions read from the television receiver 13 as described above.

In this case, the BD player 12 inserts the information in the blanking interval of the uncompressed image data (video signal) that are sent to the television receiver 13, whereby the information is sent to the television receiver 13. The BD player 12 inserts the dynamic range conversion information of the currently transmitted uncompressed image data in the blanking interval of the uncompressed image data using, for example, an HDMI vendor specific InfoFrame (hereinafter referred to as "VSIF") packet or the like. The VSIF packet is arranged in the above-mentioned data island period 26 (refer to FIG. 6).

[Exemplary Data Structure of VSIF Packet]

FIG. 12 is a diagram illustrating an exemplary data structure of the VSIF packet. In the HDMI, supplementary information about the image can be transmitted from the source device to the sink device by means of the VSIF packet. In a zeroth byte, "Packet Type (0x81)" indicating the VSIF packet is defined.

When data contents of the VSIF packet are different from data contents of the VSIF packet most recently sent, a first byte of a first byte is set to an opposite level of a "CB flag" set in the most recent VSIF packet. Specifically, a low level "0" is set for the "CB flag" in the most recent VSIF packet, and the "CB flag" is set to a high level "1" when data contents of the subsequent VSIF packet are different. For sixth to zeroth bits of the first byte, "Version (0x02)" is set.

In fourth to zeroth bits of a second byte, "Length" data are defined, and a byte length after a third byte is set. In the third byte, a checksum is defined. In fourth to sixth bytes, information represented by "24 bit IEEE Registration Identifier (0x000C03) LSB first" indicating a number "0x000C03" registered for HDMI® is arranged.

In fourth and third bits of a seventh byte, a flag indicating whether the dynamic range conversion information exists after an eighth byte is designated. When "0b00" is designated in the fourth and third bits, it is indicated that the dynamic range conversion information does not exist. When "0b01" is designated in the fourth and third bits, among the items of dynamic range conversion information, input image dynamic range information (input_d_range), input image displaying display maximum luminance information (input_disp_luminance), output image dynamic range information (output_d_range), and output displaying display maximum luminance information (output_disp_luminance) are designated in subsequent eighth to twenty-third bytes.

Since this VSIF packet has a maximum data length of 31 bytes, not all the items of information of the dynamic range conversion information can be transmitted by a single VSIF packet. Therefore, a different VSIF packet is arranged within the same image frame, and remaining items of dynamic range conversion information are transmitted. FIG. 13 is a diagram illustrating another data structure of the VSIF packet.

In a zeroth byte, "Packet Type (0x81)" indicating the VSIF packet is defined. In a first byte, "Version (0x01)" indicating a second VSIF packet is set. In fourth to zeroth bits of a second byte, "Length" data are defined, and a byte length after a third byte is set. In the third byte, a checksum is defined. In fourth to sixth bytes, information represented by "24 bit IEEE Registration Identifier (0x000C03) LSB first" indicating a number "0x000C03" registered for HDMI® is arranged.

In fourth and third bits of a seventh byte, a flag indicating whether the dynamic range conversion information exists after an eighth byte is designated. When "0b00" is designated in the fourth and third bits, it is indicated that the dynamic range conversion information does not exist. When "0b11" is designated in the fourth and third bits, the knee position information is designated after the subsequent eighth byte.

In the eighth byte, the number of items of knee position information to be transmitted by the VSIF packet is designated. After a ninth byte, the before-conversion position information (input_knee_point) and the after-conversion position information (output_knee_point) are set for every three bytes. Similarly, since this VSIF packet also has a maximum data length of 31 bytes, the maximum number of transmittable items of knee position information is nine.

When the dynamic range conversion information is transmitted using this VSIF packet, two VSIF packets need to be acquired, and the number of transmittable items of knee position information is limited to nine. Therefore, processes in the television receiver 13 become complicated. Thus, a new InfoFrame data structure may be defined and used for collectively transmitting the items of dynamic range conversion information.

[Exemplary Data Structure of DRIF Packet]

FIG. 14 is a diagram illustrating an exemplary data structure of a DRIF packet that is newly defined. In a zeroth byte, "Packet Type (0x83)" indicating a kind of a data packet is defined. In a first byte, "Version (0x01)" indicating a version of the DRIP packet is set. In a second byte, "Length" data are defined, and a byte length (maximum of 255) after a third byte is set. In the third byte, a checksum is defined. In a seventh bit of a fourth byte, a knee conversion cancellation flag "CF" is set. The knee conversion cancellation flag "CF" is a flag representing whether continuity of the most recent DRIFpacket data is to be cancelled. When the continuity is to be cancelled, a high level "1" is set. When the continuity is not to be cancelled, a low level "0" is set.

In a sixth bit of the fourth byte, a persistence flag "PF" is set. The persistence flag "PF" indicates whether the DRIP packet data sent one time are valid after that or valid only once. The persistence flag "PF" is set to a low level "0" when the DRIP packet data are valid only for a picture to which the DRIP packet data have been added. The persistence flag "PF" is set to a high level "1" when the DRIP packet data are valid until a stream is switched or new DRIP packet data arrive.

Input image dynamic range information (input_d_range) is designated in fifth to eighth bytes. Input image displaying display maximum luminance information (input_disp_luminance) is designated in ninth to twelfth bytes. Output image dynamic range information (output_d_range) is designated in thirteenth to sixteenth bytes. Output displaying display maximum luminance information (output_disp_luminance) is designated in seventeenth to twentieth bytes.

In a twenty-first byte, the number of items of knee position information to be transmitted by the DRIP packet is designated. After a twenty-second byte, the before-conversion position information (input_knee_point) and the after-conversion position information (output_knee_point) are set for every three bytes.

When the dynamic range conversion information is transmitted using the DRIF packet in this manner, the complicated processes in the television receiver 13 that occur when using the VSIF packet can be solved.

[Description of Process of Digital Camera (Encoding Device)]

Figure 15:
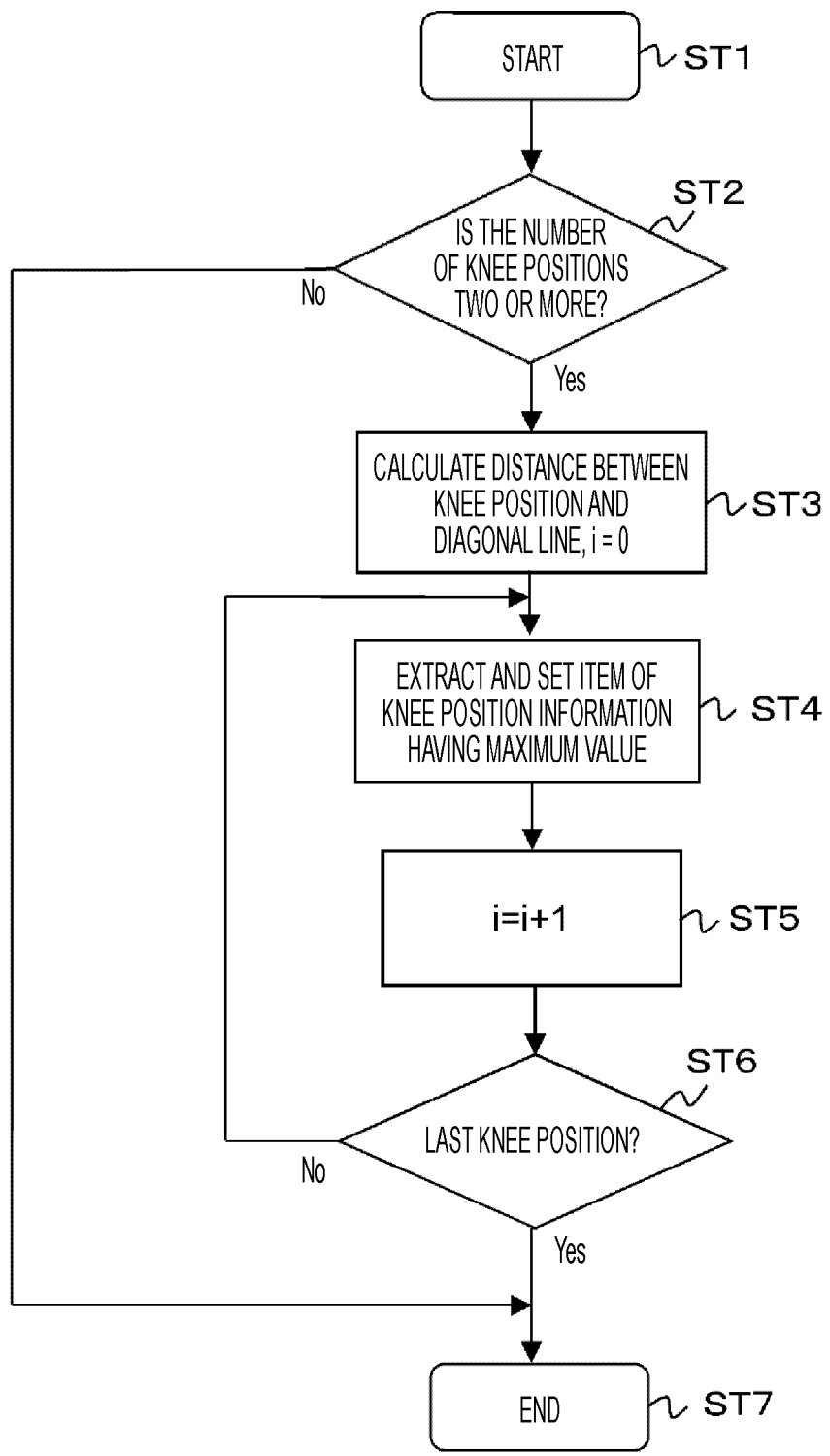
FIG. 15 is a flowchart explaining a process of determining the priority order of the items of knee position information performed by the encoding device.

FIG. 15 is a flowchart explaining a process of determining the priority order of the items of knee position information performed by the digital camera 11.

The digital camera 11 starts the process in step ST1 and proceeds to a process in step ST2. In step ST2, it is determined whether the number of items of knee position information is two or more. When the number of items of knee position information is one, the process of determining the priority order is not required. Therefore, the digital camera 11 immediately proceeds to step ST7, where the process is ended.

When the number of items of knee position information is two or more, the digital camera 11 proceeds to a process in step ST3. In step ST3, the digital camera 11 calculates a distance between the diagonal line and the knee position, and proceeds to next step ST4.

In step ST4, the digital camera 11 extracts the item of knee position information having a maximum value from the calculated items of distance information. The digital camera 11 sets an i-th item of before-conversion position information "input_knee_point [i]" and an i-th item of after-conversion position information "output knee point [i]", and proceeds to next step ST5.

In step ST5, the digital camera 11 adds a loop counter and proceeds to next step ST6.

In step ST6, the digital camera 11 determines whether the number of knee positions reaches the number of knee positions for which the priority order should be determined. When the number of knee positions does not reach the number of knee positions for which the priority order should be determined, the digital camera 11 returns to step ST4 and extracts the knee position having the next maximum value. When the number of knee positions reaches the number of knee positions for which the priority order should be determined, the digital camera 11 proceeds to step ST7, where the process is ended.

As described above, the digital camera 11 sets and stores the knee function info SEI including the dynamic range conversion information set in the priority order of the knee positions. Therefore, a reception side can perform the conversion into a desired dynamic range image on the basis of the dynamic range conversion information. Thus, it can be said that the digital camera 11 can encode a captured image so that a decoded uncompressed image can be converted into a desired dynamic range image at the time of decoding.

Figure 16:
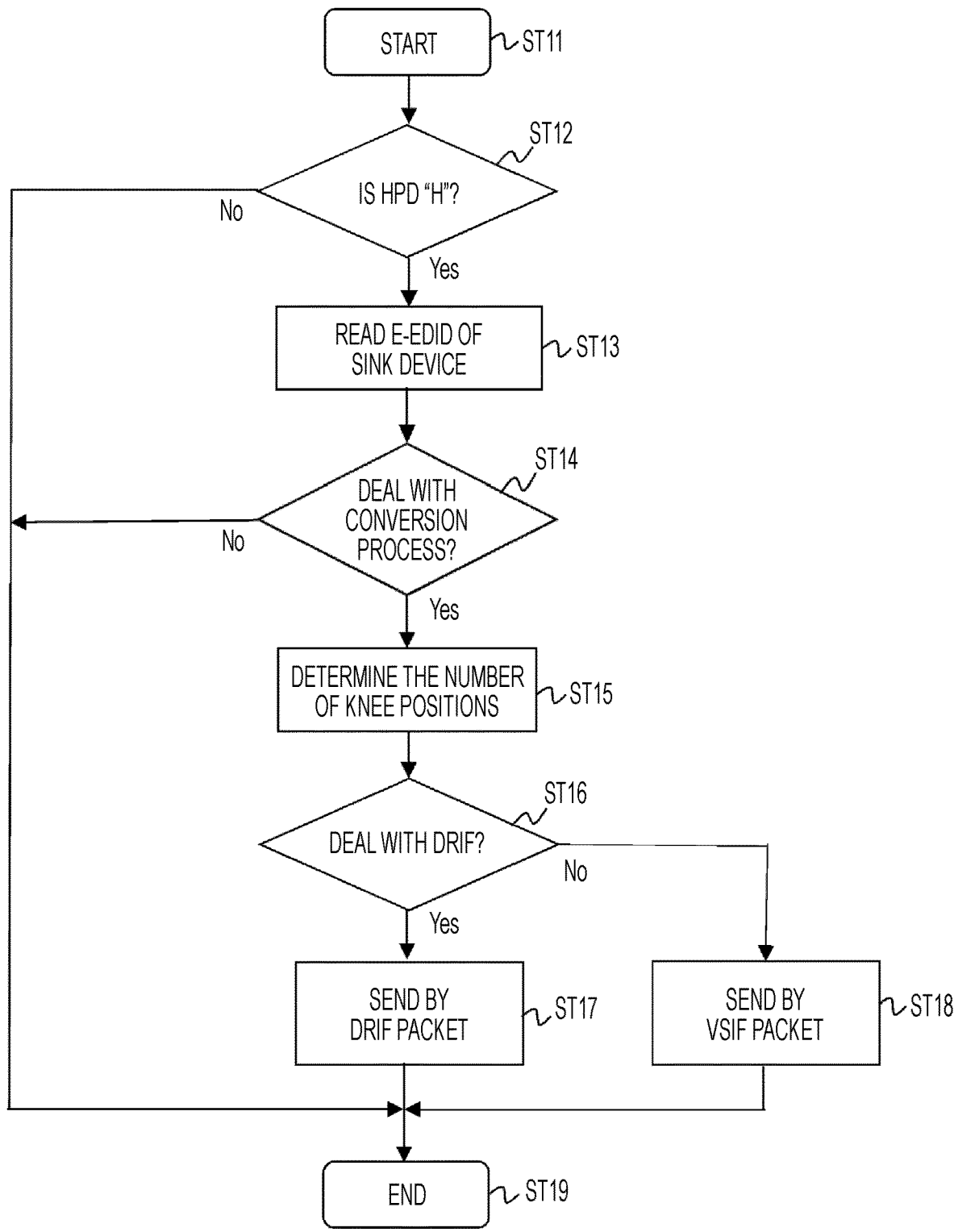
FIG. 16 is a flowchart an exemplary process performed by the BD player at the time of connection of the television receiver.

FIG. 16 is a flowchart explaining a process of sending the knee position information performed by the BD player 12.

The BD player 11 starts the process in step ST11 and proceeds to a process in step ST12. In step ST12, the BD player 12 determines whether an HPD signal is at a high level "H". When the HPD signal is not at the high level "H", it is determined that the television receiver 13 is not connected to the BD player 12, and the BD player 12 immediately proceeds to step ST19, where the process is ended.

When the HPD signal is at the high level "H", the BD player 12 reads the E-EDID of the television receiver 13 in step ST13. Then, the BD player 12 determines whether the television receiver 13 deals with a dynamic range conversion process in step ST14. When the television receiver 13 does not deal with the dynamic range conversion process, the BD player 12 proceeds to step ST19, where the process is ended.

In addition, when the television receiver 13 deals with the dynamic range conversion process in step ST14, the BD player 12 determines the number of items of knee position information to be sent to the television receiver 13 in step ST15. Then, the BD player 12 determines whether the television receiver 13 deals with the DRIB packet in step ST16.

When the television receiver 13 deals with the DRIB packet, the BD player 12 sets the dynamic range conversion information for the DRIF packet step ST17, sends the dynamic range conversion information to the television receiver 13, and proceeds to step ST19, where the process is ended.

When the television receiver 13 does not deal with the DRIF packet, the BD player 12 sets the dynamic range conversion information for the VSIF packet in step ST18, sends the dynamic range conversion information to the television receiver 13, and proceeds to step ST19, where the process is ended.

As described above, the BD player 12 sends, by means of a supported packet form, the dynamic range conversion information including the items of knee position information set in the priority order, the number of which is equivalent to the number of knee positions which the television receiver 13 deals with. Therefore, the television receiver 13 can perform the conversion into a desired dynamic range image on the basis of the received dynamic range conversion information.

2. Variation

In the above-mentioned embodiment, the digital camera 11 delivers the dynamic range conversion information to the BD player 12 via the storage medium 14.

For example, the digital camera 11 may deliver the dynamic range conversion information to the BD player 12 via a digital broadcasting wave, an IP packet, a cable television broadcasting wave, a wireless radio (Wi-Fi), or a public line network (3G or LTE).

In addition, in the above-mentioned embodiment, the digital camera 11 determines the priority order of the items of knee position information, rearranges the before-conversion position information and the after-conversion position information in accordance with the priority order, and generates the knee function info SEI. However, the before-conversion position information and the after-conversion position information to which priority order information has been added may be generated, and the knee function info SEI may be generated in arbitrary order.

In addition, in the above-mentioned embodiment, as the method of determining the priori ty order of the items of knee position information, the digital camera 11 determines the priority order by calculating the distance information between the knee position and the diagonal line. However, other methods may also be used to determine the priority order.

Note that in the above-mentioned embodiment, the BD player 12 sends the dynamic range conversion information to the television receiver 13 by inserting the dynamic range conversion information in the blanking interval of the uncompressed image data using the VSIF packet or the DRIP packet.

For example, the BD layer 12 may send the dynamic range conversion information to the television receiver 13 via the CEC line 24 that is a control data line of the HDMI cable 15. In addition, alternatively, for example, the BD player 12 may send the dynamic range conversion information to the television receiver 13 via the bidirectional communication channel including the reserve line 37 and the HPD line 35 of the HDMI cable 15.

In addition, in the above-mentioned embodiment, the E-EDID of the television receiver 13 includes the number of items of knee position information which the television receiver 13 deals with and/or DRIF packet support information. The BD player 12 reads the E-EDID vi a the DDC 33 of the HDMI cable 15, thereby acquiring the number of items of knee position information which the television receiver 13 deals with and/or the DRIP packet support information.

However, the BD player 12 may receive the number of items of knee position information which the television receiver 13 deals with and/or the DRIF packet support information from the television receiver 13 via the CEC line 34, namely, the control data line of the HDMI cable 15, or via the bidirectional communication channel including the reserve line 37 and the HPD line 35 of the HDMI cable 15.

In addition, in the above-mentioned embodiment, the priority order information is added to the plurality of items of knee position information added to the encoded data received by the BD player 12 from the digital camera 11. However, when the priority order information is not added to the plurality of items of knee position information added to the encoded data received by the BD player 12, the priority order can be determined in the BD player 12. In this case, a method of determining the priority order is performed in a similar way to the above-mentioned determining method in the digital camera 11 although a detailed description is omitted.

In addition, the above-mentioned embodiment has described an example in which the HDMI transmission line is used. However, examples of a baseband digital interface include, in addition to the HDMI, a mobile high-definition link (MHL), a digital visual interface (DVI) interface, an optical fiber interface, and a wireless interface using a 60 GHz millimeter wave or the like. The present technology can be similarly applied to a case where the dynamic range conversion information is transmitted by each of these digital interfaces. The "HDMI" and the "MHL" are registered trademarks.

In addition, the above-mentioned embodiment has described an example in which the BD player 12 is used as a sending device (source device) and the television receiver 13 is used as a receiving device (sink device). Needless to say, however, the present technology can be similarly applied to a case where other sending devices and receiving devices are used.

In addition, the technique can also be configured as follows.

(1) An encoding device including:
a setting unit configured to set a plurality of items of knee position information about a conversion from a first dynamic range image into a second dynamic range image;
an encoding unit configured to encode the second dynamic range image to generate encoded data;
a determination unit configured to determine priority order of the plurality of items of knee position information; and
an adding unit configured to add the plurality of items of knee position information to the encoded data of the second dynamic range image, with the priority order given to the plurality of items of knee position information.

(2) The encoding device according to (1), further including
a storage processing unit configured to store, in a storage medium, the encoded data of the second dynamic range image to which the plurality of items of knee position information has been added.

(3) The encoding device according to (1) or (2), wherein
the priority order is given to the plurality of items of knee position information in such a manner that an array is arranged in the priority order.

(4) The encoding device according to (1) or (2), wherein
the priority order is given to the plurality of items of knee position information in such a manner that information indicating a priority relation of the plurality of items of knee position information is added.

(5) The encoding device according to any of (1) to (4), wherein
the determination unit determines the priority order of the plurality of items of knee position information on the basis of a compression/extension rate of a knee position indicated by each of the plurality of items of knee position information.

(6) An encoding method including:
a setting step of setting a plurality of items of knee position information about a conversion from a first dynamic range image into a second dynamic range image;
an encoding step of encoding the second dynamic range image by means of an encoding unit to generate encoded data;
a determination step of determining priority order of the plurality of items of knee position information; and
an adding step of adding the plurality of items of knee position information to the encoded data of the second dynamic range image, with the priority order given to the plurality of items of knee position information.

(7) A program for causing a computer to function as:
a setting means configured to set a plurality of items of knee position information about a conversion from a first dynamic range image into a second dynamic range image;
an encoding means configured to encode the second dynamic range image to generate encoded data;
a determination means configured to determine priority order of the plurality of items of knee position information; and
an adding means configured to add the plurality of items of knee position information to the encoded data of the second dynamic range image, with the priority order given to the plurality of items of knee posit on information.

(8) A sending device including:
a data sending unit configured to send uncompressed image data of a second dynamic range image to an external device via a transmission line; and
an information sending unit configured to send, to the external device via the transmission line, a plurality of items of knee position information about a conversion from a first dynamic range image into the second dynamic range image, with the plurality of terms of knee position information limited to the number of knee positions which the external device is capable of dealing with.

(9) The sending device according to (8), further including
an information receiving unit configured to receive, from the external device, information of the number of knee positions which the external device is capable of dealing with.

(10) The sending device according to (8) or (9), further including:

a data acquisition unit configured to acquire encoded data of the second dynamic range image to which a plurality of items of knee position information has been added, with priority order given to the plurality of items of knee position information;

a decoding unit configured to decode the encoded data of the second dynamic range image to obtain the uncompressed image data of the second dynamic range image; and an information selecting unit configured to select, from among the plurality of items of knee position information on the basis of the priority order, the item of knee position information, the number of which is equivalent to the number of knee positions which the external device is capable of dealing with.

(11) The sending device according to any of (8) to (10), wherein the data sending unit sends the uncompressed image data to the external device via the transmission line by means of a differential signal.

(12) The sending device according to any of (8) to (11), wherein the information sending unit sends, to the external device, the plurality of items of knee position information of the uncompressed image data that are sent by the data sending unit by inserting the plurality of items of knee position information in a blanking interval of the uncompressed image data.

(13) A sending method including:

a data sending step of sending uncompressed image data of a second dynamic range image to an external device via a transmission line; and an information sending step of sending, to the external device via the transmission line, a plurality of items of knee position information about a conversion from a first dynamic range image into the second dynamic range image, with the plurality of items of knee position information limited to the number of knee positions which the external device is capable of dealing with.

(14) A program that causes a computer to function as:

a data sending means configured to send uncompressed image data of a second dynamic range image to an external device via a transmission line; and an information sending means configured to send, to the external device via the transmission line, a plurality of items of knee position information about a conversion from a first dynamic range image into the second dynamic range image, with the plurality of items of knee position information limited to the number of knee positions which the external device is capable of dealing with.

(15) A receiving device including:

a data receiving unit configured to receive uncompressed image data of a second dynamic range image from an external device via a transmission line;

an information receiving unit configured to receive, from the external device via the transmission line, a plurality of items of knee position information about a conversion from a first dynamic range image into the second dynamic range image;

a conversion processing unit configured to perform, on the uncompressed image data of the second dynamic range image, a dynamic range conversion process that is based on the plurality of items of knee position information; and an information sending unit configured to send, to the external device via the transmission line, information of the number of knee positions which the receiving device itself is capable of dealing with.

(16) The receiving device according to (15), further including a storage unit configured to store the information of the number of knee positions, wherein the information sending unit acquires and sends the information of the number of knee positions from the storage unit.

(17) The receiving device according to (15) or (16), wherein the data receiving unit receives the uncompressed image data from the external device via the transmission line by means of a differential signal.

(18) The receiving device according to any of (15) to (17), wherein the information receiving unit extracts the plurality of items of knee position information of the uncompressed image data received by the data receiving unit from a blanking interval of the uncompressed image data.

(19) A receiving method including:

a data receiving step of receiving uncompressed image data of a second dynamic range image from an external device via a transmission line;

an information receiving step of receiving, from the external device via the transmission line, a plurality of items of knee position information about a conversion from a first dynamic range image into the second dynamic range image;

a conversion processing step of performing, on the uncompressed image data of the second dynamic range image, a dynamic range conversion process that is based on the plurality of items of knee position information; and an information sending step of sending, to the external device via the transmission line, information of the number of knee positions which an own device is capable of dealing with.

(20) A program, that causes a computer to function as:

a data receiving means configured to receive uncompressed image data of a second dynamic range image from an external device via a transmission line;

an information receiving means configured to receive, from the external device via the transmission line, a plurality of items of knee position information about a conversion from a first dynamic range image into the second dynamic range image;

a conversion processing means configured to perform, on the uncompressed image data of the second dynamic range image, a dynamic range conversion process that is based on the plurality of items of knee position information; and an information sending means configured to send, to the external device via the transmission line, information of the number of knee positions which an own device is capable of dealing with.

REFERENCE SIGNS LIST

10 AV system
11 Digital camera
11a Imaging unit
11b Conversion unit
11c Setting unit
11d Encoding unit
11f Storage processing unit
12 BD player
12a HDMI terminal
12b HDMI sending unit
12c High speed bus interface
12d Decoding unit
12e Information sending unit 12f Information receiving unit
13 Television receiver
13a HDMI terminal
13b HDMI receiving unit
13c High speed bus interface
13d Conversion unit
13e Information receiving unit
13f Information sending unit
13g Storage unit
14 Storage medium
15 HDMI cable
21 Valid image period
22 Horizontal blanking period
23 Vertical blanking period
24 Video data period
25 Data island period
26 Control period
31 HDMI transmitter
32 HDMI receiver
33 DDC line
34 CEC line
35 HPD line
36 Power source line
37 Reserve line
121 Imager
122 Imager driver
123 Imaging signal processing circuit
124 Camera control CPU
125 Still image signal processing circuit
126 Image signal processing circuit
128 Recording/reproducing unit
129 Recording medium
130 System control CPU
131 Flash ROM
132 SDRAM
133 User operation unit
134 Microphone
135 Audio signal processing circuit
136 Panel drive circuit
137 Display panel
140 Graphic generating circuit
141 Display control unit
142 Power source unit
204 CPU
205 Internal bus
206 Flash ROM
207 SDRAM
208 Remote control receiving unit
209 Remote control sender
210 Storage medium control interface
211a BD drive
211b HDD
211c SSD
212 Ethernet interface
213 Network terminal
215 MPEG decoder
216 Graphic generating circuit
217 Video output terminal
218 Audio output terminal
221 Display control unit
222 Panel drive circuit
223 Display panel
224 Power source unit
305 Antenna terminal
306 Digital tuner
307 MPEG decoder
308 Video signal processing circuit
309 Graphic generating circuit
310 Panel drive circuit
311 Display panel
312 Audio signal processing circuit
313 Audio amplification circuit
314 Speaker
320 Internal bus
321 CPU
322 Flash ROM
323 DRAM
324 Ethernet interface
325 Network terminal
326 Remote control receiving unit
327 Remote control sender
331 Display control unit
332 Power source unit

The invention claimed is:

1. A receiving device comprising:
a data receiving unit configured to receive uncompressed image data of a second dynamic range image from an external device via a transmission line;
an information receiving unit configured to receive, from the external device via the transmission line, a predetermined number of items of knee position information about a conversion from a first dynamic range image into the second dynamic range image;
a conversion processing unit configured to perform, on the uncompressed image data of the second dynamic range image, a dynamic range conversion process that is based on the predetermined number of items of knee position information; and
an information sending unit configured to send, to the external device via the transmission line, information of a number of knee positions which the receiving device itself is capable of dealing with,
wherein the data receiving unit, the information receiving unit, the conversion processing unit, and the information sending unit are each implemented via at least one processor.

2. The receiving device according to claim 1, further comprising
a computer-readable medium configured to store the information of the number of knee positions, wherein
the information sending unit acquires and sends the information of the number of knee positions from the computer-readable medium.

3. The receiving device according to claim 1, wherein
the data receiving unit receives the uncompressed image data from the external device via the transmission line by means of a differential signal.

4. The receiving device according to claim 1, wherein
the information receiving unit extracts the predetermined number of items of knee position information of the uncompressed image data received by the data receiving unit from a blanking interval of the uncompressed image data.

5. A receiving method comprising:
receiving uncompressed image data of a second dynamic range image from an external device via a transmission line;
receiving, from the external device via the transmission line, a predetermined number of items of knee position information about a conversion from a first dynamic range image into the second dynamic range image;
performing, on the uncompressed image data of the second dynamic range image, a dynamic range conversion process that is based on the predetermined number of items of knee position information; and sending, to the external device via the transmission line, information of a number of knee positions which an own device is capable of dealing with.

6. A non-transitory computer-readable medium having embodied thereon a program, which when executed by a computer causes the computer to execute a method, the method comprising:

receiving uncompressed image data of a second dynamic range image from an external device via a transmission line;

receiving, from the external device via the transmission line, a predetermined number of items of knee position information about a conversion from a first dynamic range image into the second dynamic range image;

performing, on the uncompressed image data of the second dynamic range image, a dynamic range conversion process that is based on the predetermined number of items of knee position information; and sending, to the external device via the transmission line, information of a number of knee positions which an own device is capable of dealing with.

\* \* \* \* \*